United States Patent [19]

Hwang et al.

[11] Patent Number: 4,944,029
[45] Date of Patent: Jul. 24, 1990

[54] REARRANGEABLE MULTICONNECTION SWITCHING NETWORKS CONSTRUCTED USING COMBINATORIAL DESIGNS

[75] Inventors: Frank K. Hwang, Warren, N.J.; Gaylord W. Richards, Naperville, Ill.

[73] Assignee: AT&T Bell Laboratories, Murray Hill, N.J.

[21] Appl. No.: 382,501

[22] Filed: Jul. 19, 1989

Related U.S. Application Data

[62] Division of Ser. No. 946,431, Dec. 23, 1986, Pat. No. 4,887,079.

[51] Int. Cl.$^5$ .......................... H04Q 3/62; H04M 3/00
[52] U.S. Cl. .............................. 340/825.800; 340/826; 340/827; 379/271
[58] Field of Search ........... 340/825.79, 825.8, 825.03, 340/825.91, 826, 827; 307/113, 115; 379/271, 272; 364/200, 900

[56] References Cited

U.S. PATENT DOCUMENTS

| | | |
|---|---|---|
| 3,129,407 | 4/1964 | Paull . |
| 4,038,638 | 7/1977 | Hwang . |
| 4,400,627 | 8/1983 | Zola . |
| 4,417,245 | 11/1983 | Melas et al. ...................... 340/825.8 |
| 4,566,007 | 1/1986 | Richards ......................... 340/825.8 |

OTHER PUBLICATIONS

C. Clos, "A Study on Non-Blocking Switching Networks", *The Bell System Technical Journal*, Mar. 1953, pp. 406–424.
V. E. Benes, "On Rearrangeable Three-Stage Connecting Networks", *The Bell System Technical Journal*, vol. XLI, No. 5, Sep. 1962, pp. 1481–1492.
L. D. Baumert, "Cyclic Difference Sets", *Lecture Notes in Mathematics*, 1971, pp. 1–158.
G. M. Masson, "Binomial Switching Networks for Concentration and Distribution", *IEEE Transactions on Communications*, vol. Com-25, No. 9, Sep. 1977, pp. 873–883.
F. K. Hwang, "Three-Stage Multiconnection Networks which are Nonblocking in the Wise Sense", *The Bell System Technical Journal*, vol. 58, No. ID, Dec. 1979, pp. 2183–2187.
M. M. Mano, *Computer System Architecture*, Second Edition, 1982, pp. 8–21.
R. W. Kufta, *Interconnection Networks with Fan-out Capabilities*, Thesis, May 1983.
R. W. Kufta et al., "Multiple Stage Switching Networks with Fan-out Capabilities", *Proceedings of the IEEE Computer Network Symposium*, Dec. 13, 1983, pp. 89–96.
M. Hall, Jr., *Combinatorial Theory*, John Wiley & Sons, Inc., 1986, Chapters 10, 11, 13, 15 and Appendix I.
F. K. Hwang et al., "A Two-Stage Rearrangeable Broadcast Switching Network", 8089 *IEEE Transactions on Communications*, COM-33, Oct. 1985, pp. 1025–1035.
G. W. Richards, "Rearrangeable Multiconnection Switching Networks", PCT Patent App. No. US84/00569, Nov. 1984, pp. 1–35.
K. Kodaira et al., "Balanced Skip Multiples and Their Witing Algorithms", Ninth International Teletraffic Congress, Oct. 1979, pp. 1–7.

*Primary Examiner*—Ulysses Weldon
*Attorney, Agent, or Firm*—Ross T. Watland

[57] ABSTRACT

A switching network where a large class of combinatorial designs which are well known in the mathematical literature are for the first time applied to advantageously define the pattern of permanent connections effected between network input channels and initial network crosspoints, illustratively by a connection arrangement of a two-stage, rearrangeable network. The class of combinatorial designs comprises designs of three types: (1) block designs, (2) orthogonal arrays, and (3) difference sets. Each of these is used in a unique manner to derive an advantageous pattern of permanent connections.

6 Claims, 24 Drawing Sheets

|  | COLUMN | | |
|---|---|---|---|
| | 0 | 1 | 2 |
| 0 | 0 | 1 | 2 |
| 1 | 0 | 1 | 5 |
| 2 | 0 | 2 | 4 |
| 3 | 0 | 3 | 4 |
| R O W  4 | 0 | 3 | 5 |
| 5 | 1 | 2 | 3 |
| 6 | 1 | 3 | 4 |
| 7 | 1 | 4 | 5 |
| 8 | 2 | 3 | 5 |
| 9 | 2 | 4 | 5 |

(6,10,5,3,2) BLOCK DESIGN

| ROW | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 1 | 1 | 1 | 1 | 2 | 2 | 2 | 2 | 3 | 3 | 3 | 3 |
| 1 | 0 | 1 | 2 | 3 | 0 | 1 | 2 | 3 | 0 | 1 | 2 | 3 | 0 | 1 | 2 | 3 |
| 2 | 0 | 1 | 2 | 3 | 1 | 0 | 3 | 2 | 2 | 3 | 0 | 1 | 3 | 2 | 1 | 0 |

COLUMN

ORTHOGONAL ARRAY OF ORDER 4 AND DEPTH 3

FIG. 8

| ROW | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 1 | 1 | 1 | 1 | 2 | 2 | 2 | 2 | 3 | 3 | 3 | 3 |
| 1 | 4 | 5 | 6 | 7 | 4 | 5 | 6 | 7 | 4 | 5 | 6 | 7 | 4 | 5 | 6 | 7 |
| 2 | 8 | 9 | 10 | 11 | 9 | 8 | 11 | 10 | 10 | 11 | 8 | 9 | 11 | 10 | 9 | 8 |

COLUMN

CONNECTION MATRIX CORRESPONDING TO OA(4,3)

FIG. 9

$$\begin{cases} D_1 = \{0,2,3,4\} \\ D_2 = \{0,4,6,1\} \end{cases}$$

TWO (7,4,2) DIFFERENCE SETS

FIG. 15

|   | 0 | 2 | 3 | 4 |
|---|---|---|---|---|
| 0 | ✕ | 5 | 4 | 3 |
| 2 | 2 | ✕ | 6 | 5 |
| 3 | 3 | 1 | ✕ | 6 |
| 4 | 4 | 2 | 1 | ✕ |

DIFFERENCE TABLE FOR $D_1$

FIG. 16

| ROW | COLUMN | | | |
|---|---|---|---|---|
| | 0 | 1 | 2 | 3 |
| 0 | 0 | 7 | 14 | 21 |
| 1 | 1 | 8 | 15 | 22 |
| 2 | 2 | 9 | 16 | 23 |
| 3 | 3 | 10 | 17 | 24 |
| 4 | 4 | 11 | 18 | 25 |
| 5 | 5 | 12 | 19 | 26 |
| 6 | 6 | 13 | 20 | 27 |
| 7 | 0 | 12 | 18 | 24 |
| 8 | 1 | 13 | 19 | 25 |
| 9 | 2 | 7 | 20 | 26 |
| 10 | 3 | 8 | 14 | 27 |
| 11 | 4 | 9 | 15 | 21 |
| 12 | 5 | 10 | 16 | 22 |
| 13 | 6 | 11 | 17 | 23 |
| 14 | 0 | 10 | 15 | 27 |
| 15 | 1 | 11 | 16 | 21 |
| 16 | 2 | 12 | 17 | 22 |
| 17 | 3 | 13 | 18 | 23 |
| 18 | 4 | 7 | 19 | 24 |
| 19 | 5 | 8 | 20 | 25 |
| 20 | 6 | 9 | 14 | 26 |

CONNECTION MATRIX BASED ON $D_1$ AND $D_2$

FIG. 17

REARRANGEABLE MULTICONNECTION SWITCHING NETWORKS CONSTRUCTED USING COMBINATORIAL DESIGNS

CROSS REFERENCE TO RELATED APPLICATION

This is a division of application Ser. No. 06/946,431, filed Dec. 23, 1986 now U.S. Pat. No. 4,887,079.

TECHNICAL FIELD

This invention relates to switching networks and, more particularly, to multiconnection, broadcast switching networks that are rearrangeable to avoid blocking.

BACKGROUND OF THE INVENTION

It is possible for a customer facility connected to a multistage switching network to occasionally be blocked from being connected as desired because the network happens to be interconnected in a manner that prevents effecting the desired interconnection. This, of course, is an undesirable situation which, in an appropriately designed network, is remedied by dismantling one or more existing interconnections and rearranging the interconnection paths to accommodate the new request. When such a rearrangement is possible, it is said that the new assignment, which is the new set of interconnections desired to be established, is realizable. A switching network which can realize all possible assignments without rearranging existing connections is said to be non-blocking, while a network which can realize all possible assignments only by occasionally rearranging existing connections is said to be rearrangeable. Typical rearrangeable networks have many fewer crosspoints than their non-blocking counterparts. An illustrative rearrangeable network, along with the common control equipment associated therewith, is disclosed in U.S. Pat. No. 3,129,407 issued to M. C. Paull on Apr. 14, 1964. Other rearrangeable networks are disclosed in the article by V. E. Benes, "On Rearrangeable Three-Stage Connecting Networks," Bell System Technical Journal, Vol. 41, No. 5, September 1962, pages 1481–1492 and in U.S. Pat. No. 4,038,638 issued to F. K. Hwang on July 26, 1977. Each of these known switching networks is, however, a rearrangeable point-to-point network rather than a rearrangeable multiconnection network. Further each of these networks comprises three or more stages of switching. In applications where network distortion and delay parameters directly related to the number of crosspoints required to effect a given connection are important, the transmission quality obtainable through such three-stage networks is therefore limited.

U.S. Pat. No. 4,556,007 issued to G. W. Richards on Jan. 21, 1986, discloses a two-stage, multiconnection switching network including an innovative connection arrangement that permanently connects each network input channel to a multiplicity of first stage switch inlets in a predetermined pattern. For any given assignment of input channels to the network output channels connected to a second stage switch, the network can always be arranged such that each input channel is connected by a different first stage switch to the second stage switch and therefore to the output channels which are assigned that input channel. Accordingly, the switching network is a rearrangeable multiconnection network that avoids blocking. The innovative connection pattern advantageously eliminates the need for additional stages of switching thereby reducing both the total number of network crosspoints and the number of crosspoints used to effect each interconnection.

The above-mentioned Richards patent discloses a single explicit design method for designing the connection arrangement. Although the method is effective in constructing rearrangeable, two-stage networks, the absence of other, more general design methods limits the freedom of network designers in optimizing their designs in view of practical network construction parameters such as the maximum number of terminals per circuit pack and the power dissipated per circuit pack, limits on the size of failure groups and the number of first stage switches each input channel is connected to, and constraints on the number of network input and output channels (e.g., restricting to powers of two).

In view of the foregoing, a recognized problem in the art is the limited class of known rearrangeable, two-stage networks.

SUMMARY OF THE INVENTION

The foregoing problem is solved and a technical advance is achieved in accordance with the principles of the invention in a switching network where a large class of combinatorial designs which are well known in the mathematical literature are for the first time applied to advantageously define the pattern of permanent connections effected between network input channels and initial network crosspoints, illustratively by a connection arrangement of a two-stage, rearrangeable network. The class of combinatorial designs comprises designs of three types: (1) block designs, (2) orthogonal arrays, and (3) difference sets. Each of these is further described herein and is used in a unique manner to derive an advantageous pattern of permanent connections.

One embodiment of a two-stage, rearrangeable multiconnection switching network in accordance with the invention connects $N_1$ input channels to $n_2$ output channels and comprises v first stage switches and a second stage switch, e.g., rectangular arrays. Each first stage switch has at most r inlets and at least one outlet. A single link connects a given first stage switch and the second stage switch. The second stage switch has $n_2$ outlets each connected to one of the $n_2$ output channels. A connection arrangement connects each of the first stage switch inlets to an associated predetermined input channel in accordance with a block design having five parameters: b, c, r, M, and w. The (b,c,r,M,w) block design is a matrix having the unique switch designations of the first stage switches as elements, and having the switch designations in a given row of the block design define the first stage switches connected to a given input channel associated with the given row.

In another embodiment of the invention, the connection pattern of the connection arrangement is in accordance with a $M \times N^2$ connection matrix where the elements of row i of the matrix are obtained by adding $iN$ to corresponding elements of an orthogonal array of order N and depth M. The array has the symbols $0, 1, \ldots N-1$ as elements. The matrix has the unique switch designations $d_0, d_1, \ldots d_{v-1}$, as elements and each column of the matrix is associated with at most w of the input channels. Each element e of a given column of the matrix defines that the input channels associated with the given column are connected to the first stage switch having the switch designation $d_e$.

In a third embodiment of the invention, the connections effected by the connection arrangement are in accordance with a Mu×r connection matrix derived from M−1 (u,r,w) difference sets $D_i=\{a_0^i, \ldots a_{r-1}^i\}$, $1 \leq i \leq M-1$. (The superscript i does not denote exponentiation but rather identifies the elements such as $a_0^i$ as belonging to the difference set $D_i$.) The difference sets have three parameters u, r and w. The connection matrix has Mu rows comprising M sets, $s_0, s_1, \ldots s_{M-1}$, each having u rows. The unique channel designations of the input channels each occur exactly once in set $s_0$. For any integer i, $1 \leq i \leq M-1$, and any integer j, $0 \leq j \leq r-1$, column j of set $s_i$ is obtained by rotating column j of set $s_0$ by $a_j^i$. The channel designations occurring in a given row of the matrix define the input channels connected to a given first stage switch associated with the given row.

In each of the above-described networks, the following property is true. For any group of $n_2$ of the input channels, there is a group of $n_2$ of the first stage switches each having one inlet connected to a different one of that group of $n_2$ input channels. The connections within that group of $n_2$ first stage switches are always rearrangeable to connect a different one of the group of $n_2$ input channels to the second stage switch. The connections within the second stage switch are therefore also rearrangeable to connect those input channels to the group of $n_2$ output channels. Accordingly, the network is rearrangeable to avoid the blocking of connections from the group of $n_2$ input channels to the $n_2$ output channels. In addition, any given input channel is connectible to all of the $n_2$ output channels. The approach is easily extendible to switching networks serving any larger number of output channels significantly by having multiple links between each first stage switch and the second stage switch. The approach is also extendible by adding second stage switches and connecting each additional second stage switch to each first stage switch.

In each of the above-described networks, the connection arrangement and first stage switches are replaceable by a partial concentrator having rows and columns (corresponding to the first stage switch outlets and inlets respectively) and a pattern of crosspoints at certain row-column intersections defined in an analogous way based on the combinatorial designs.

DRAWING DESCRIPTION

Figure 1:
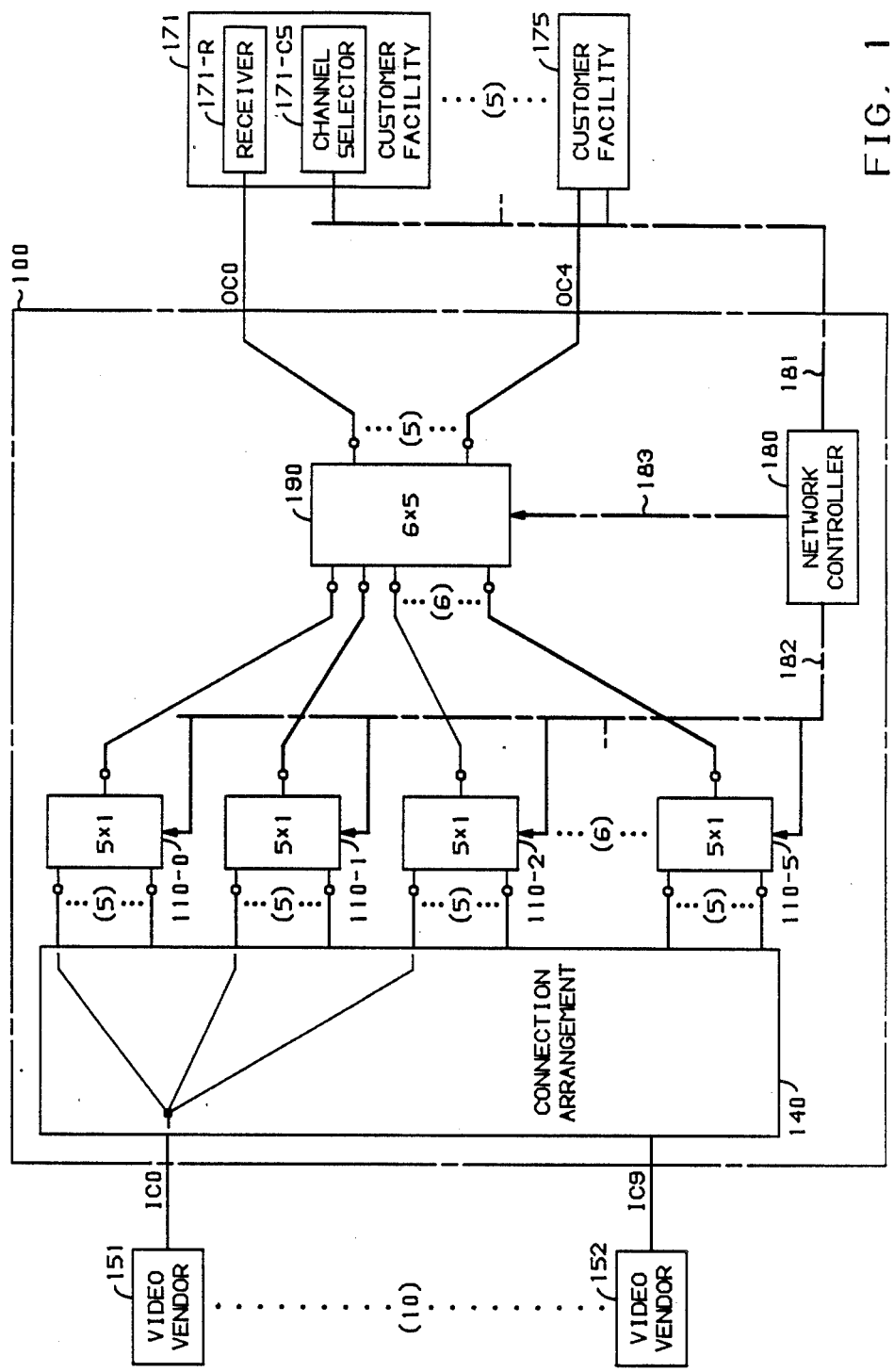
FIG. 1 is a block diagram of a two-stage, rearrangeable broadcast network constructed based on a block design shown in FIG. 2.
Figure 4:
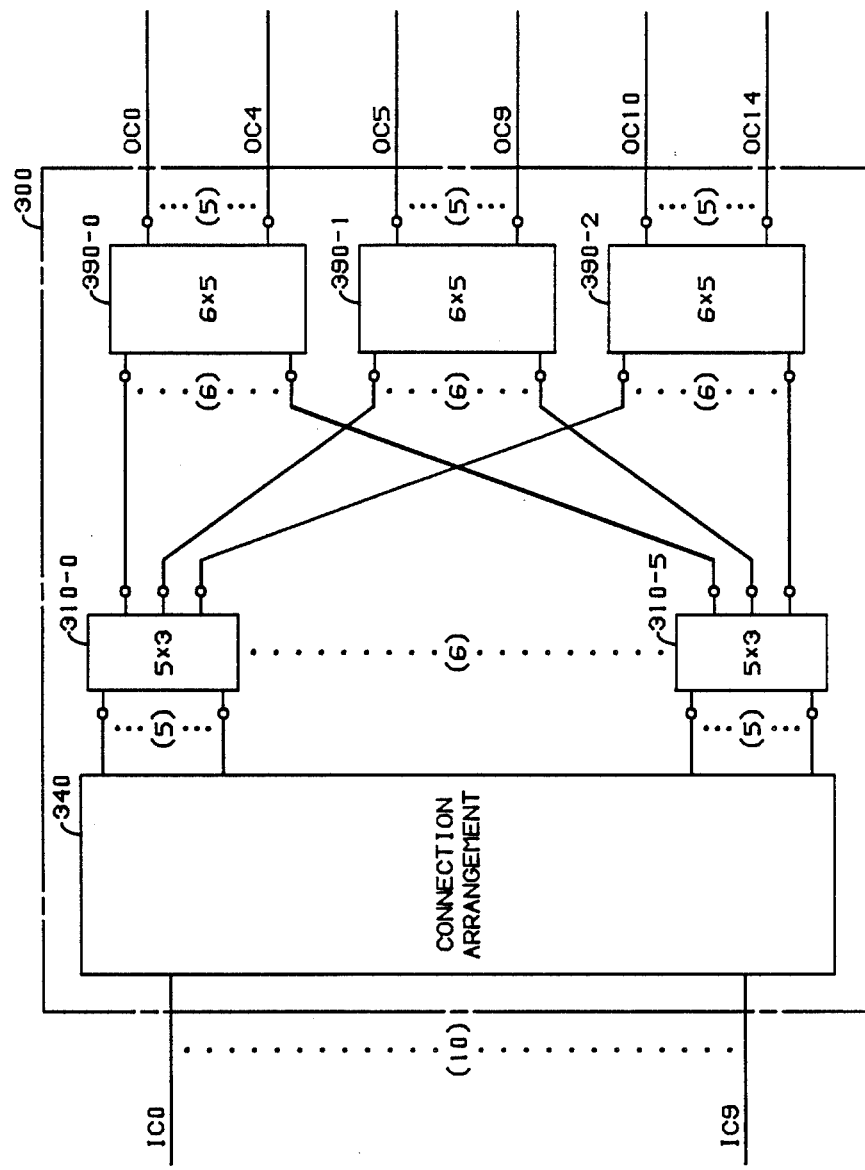
Figure 5:
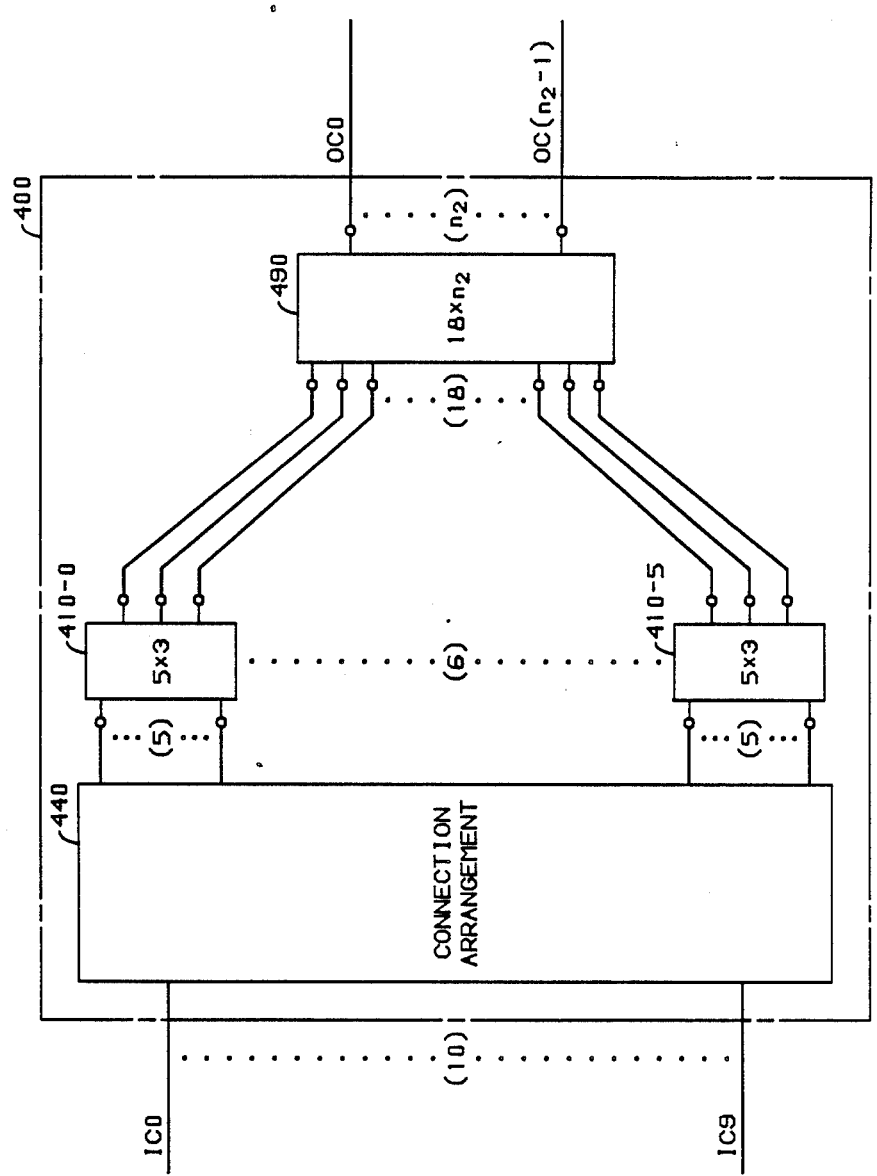
Figure 6:
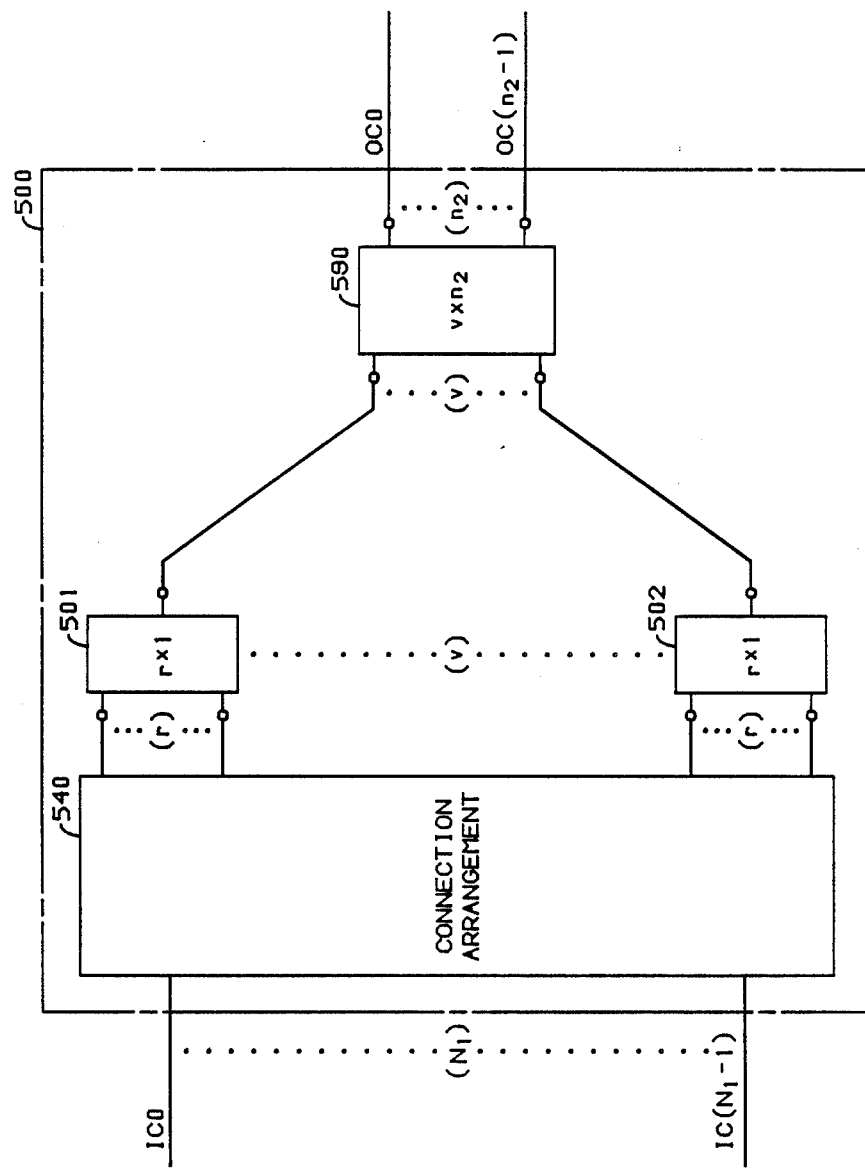
Figure 7:
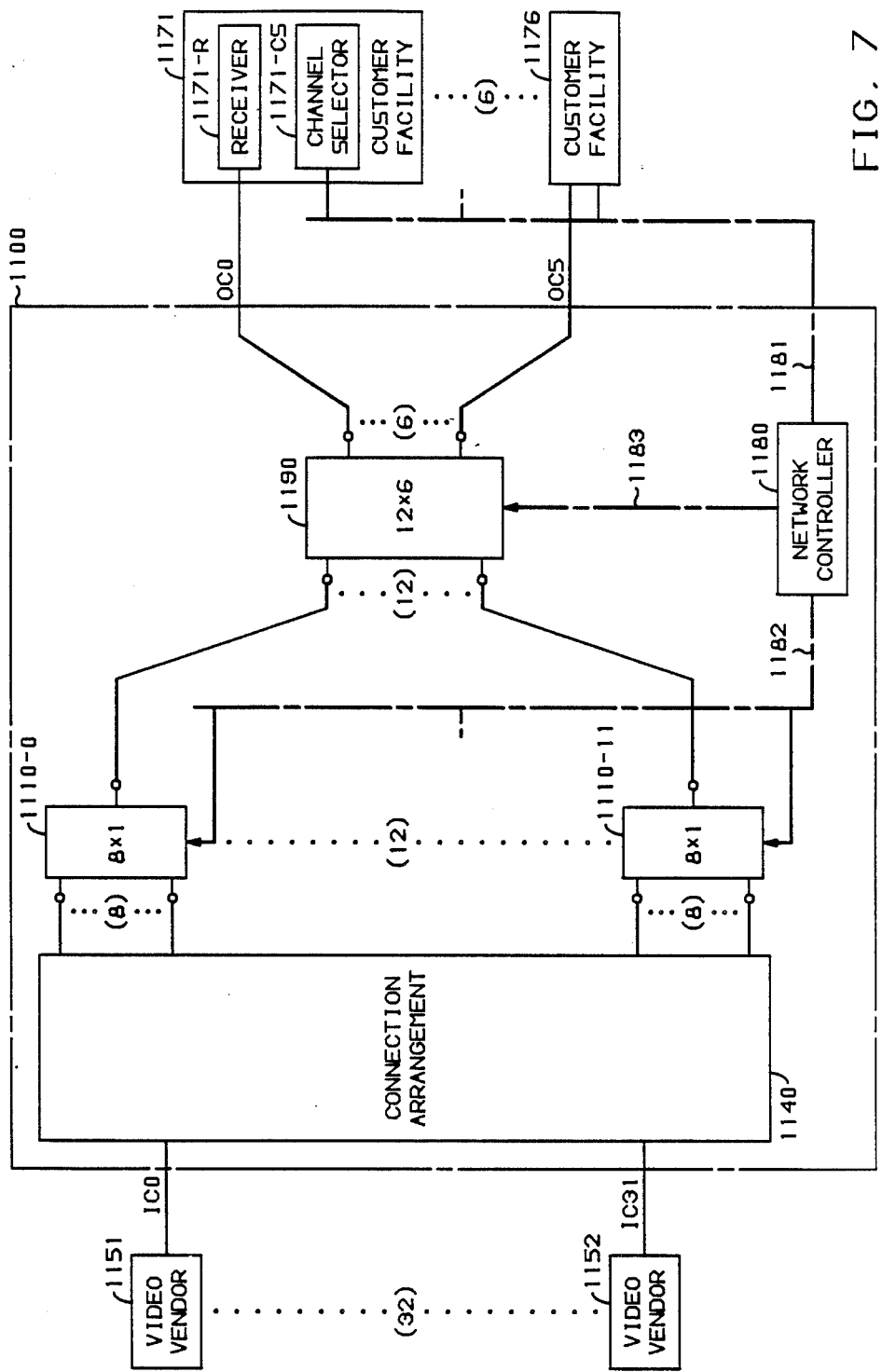
Figure 10:
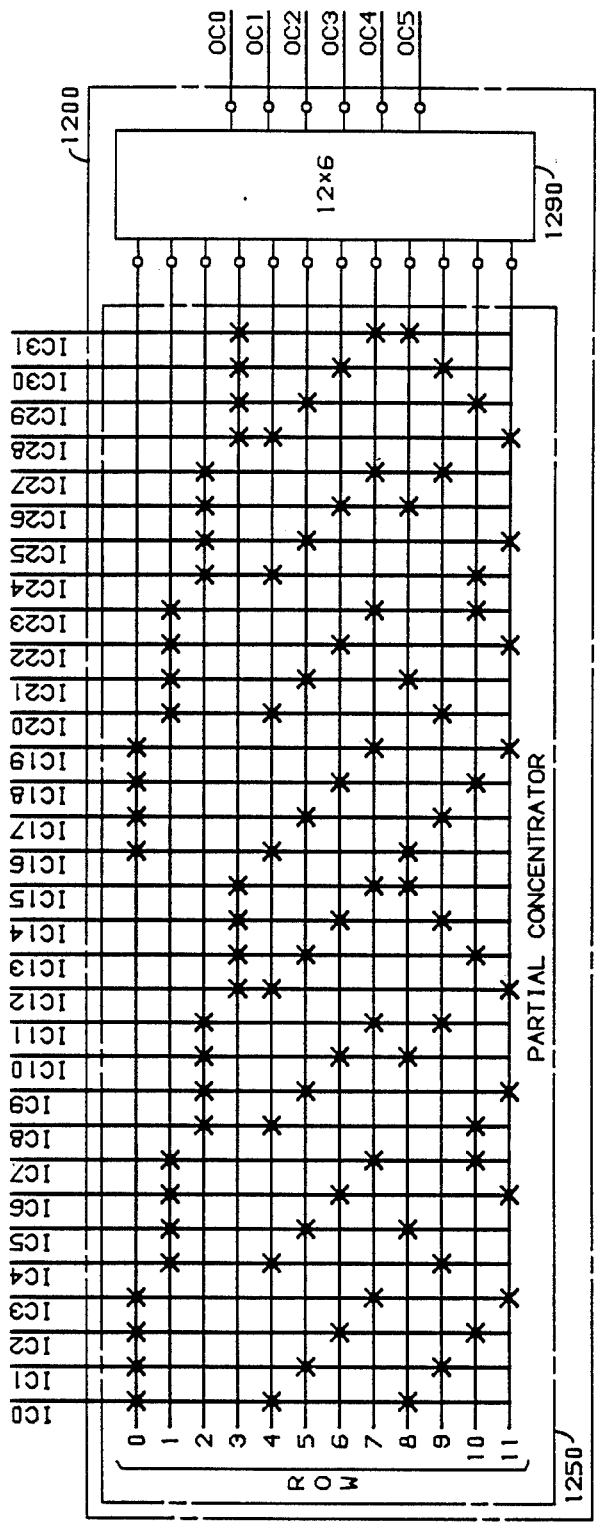
Figure 11:
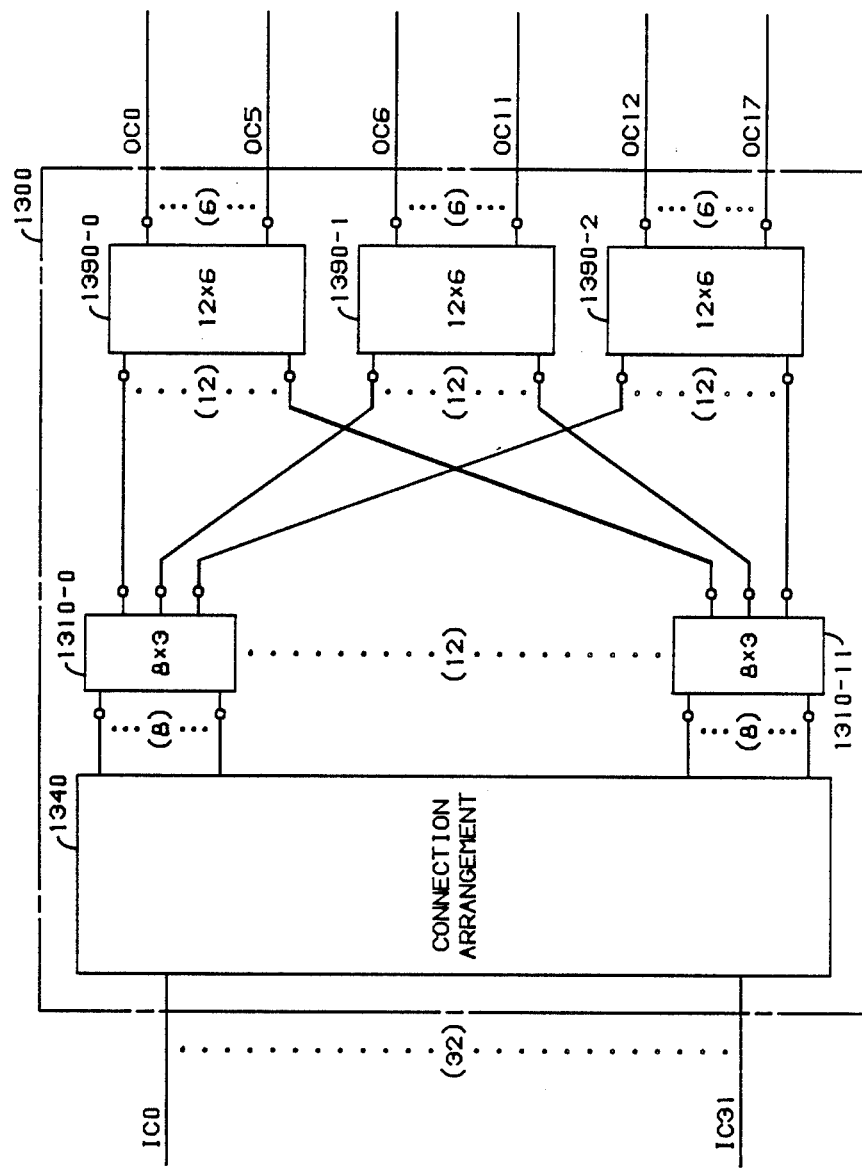
Figure 12:
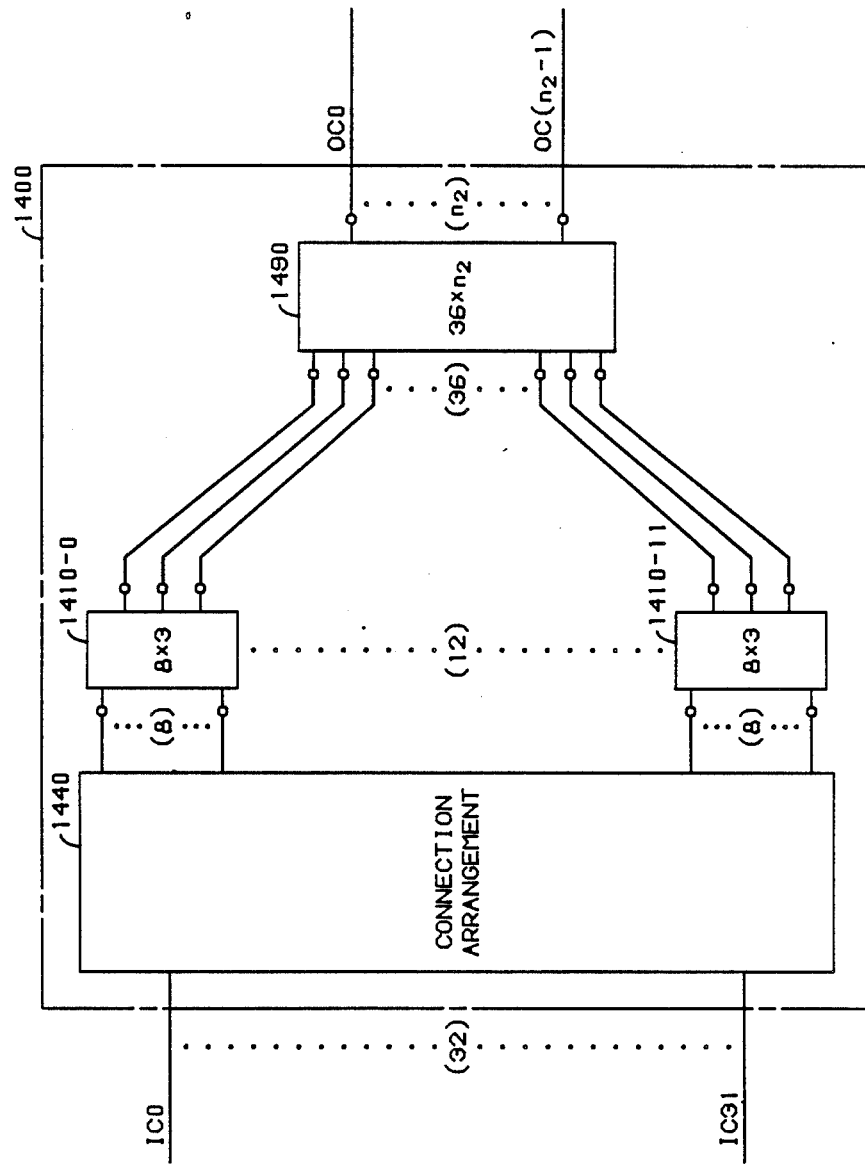
Figure 13:
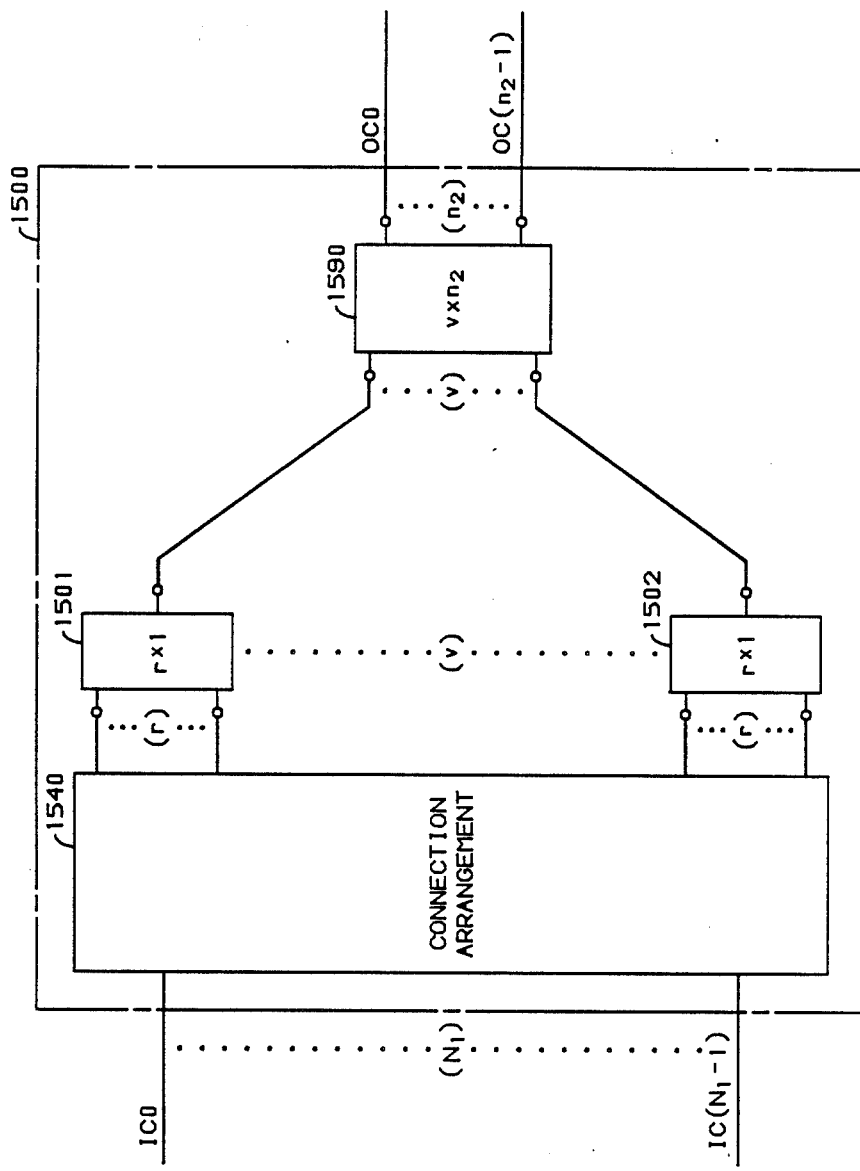
Figure 14:
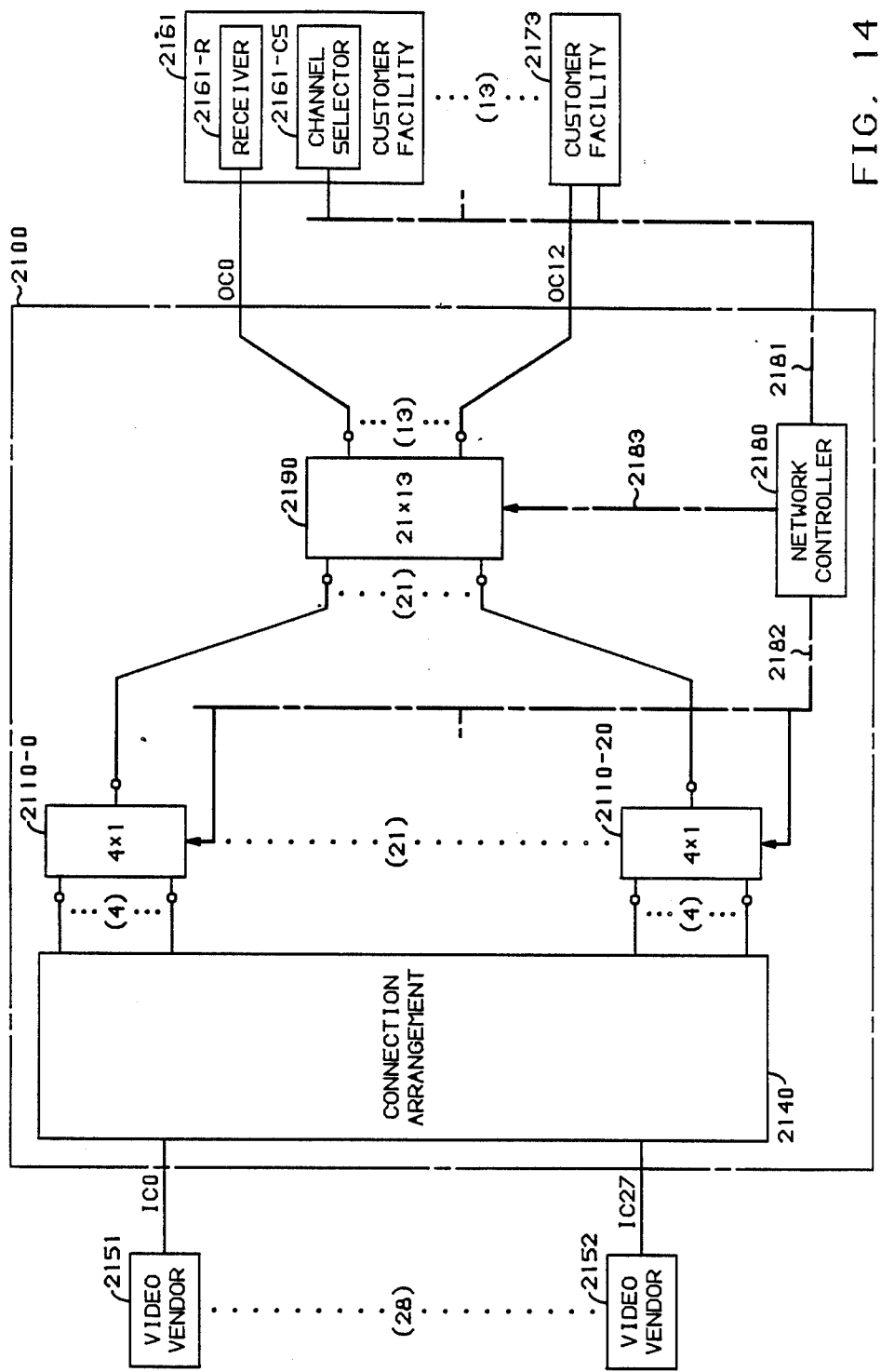
Figure 18:
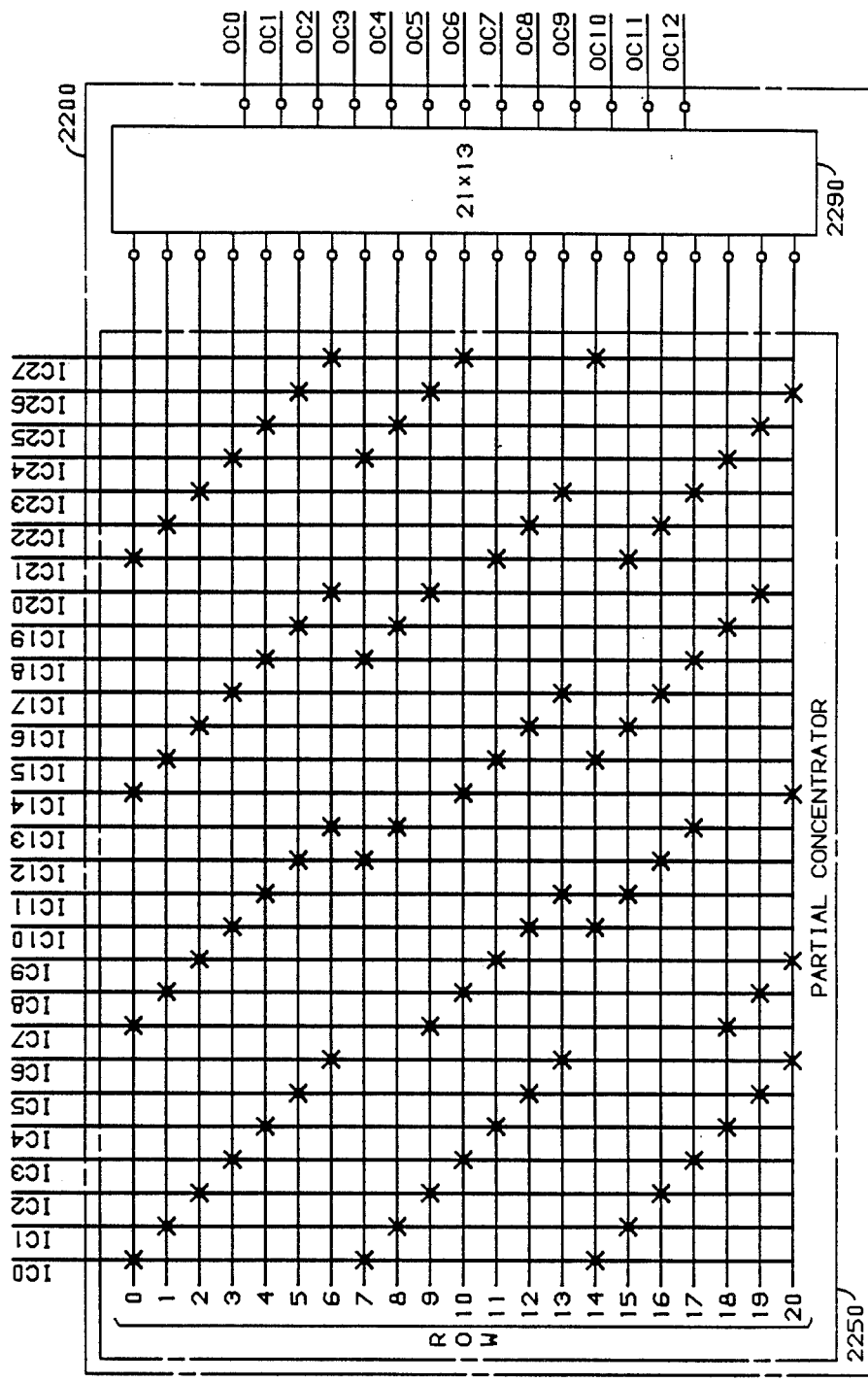
Figure 19:
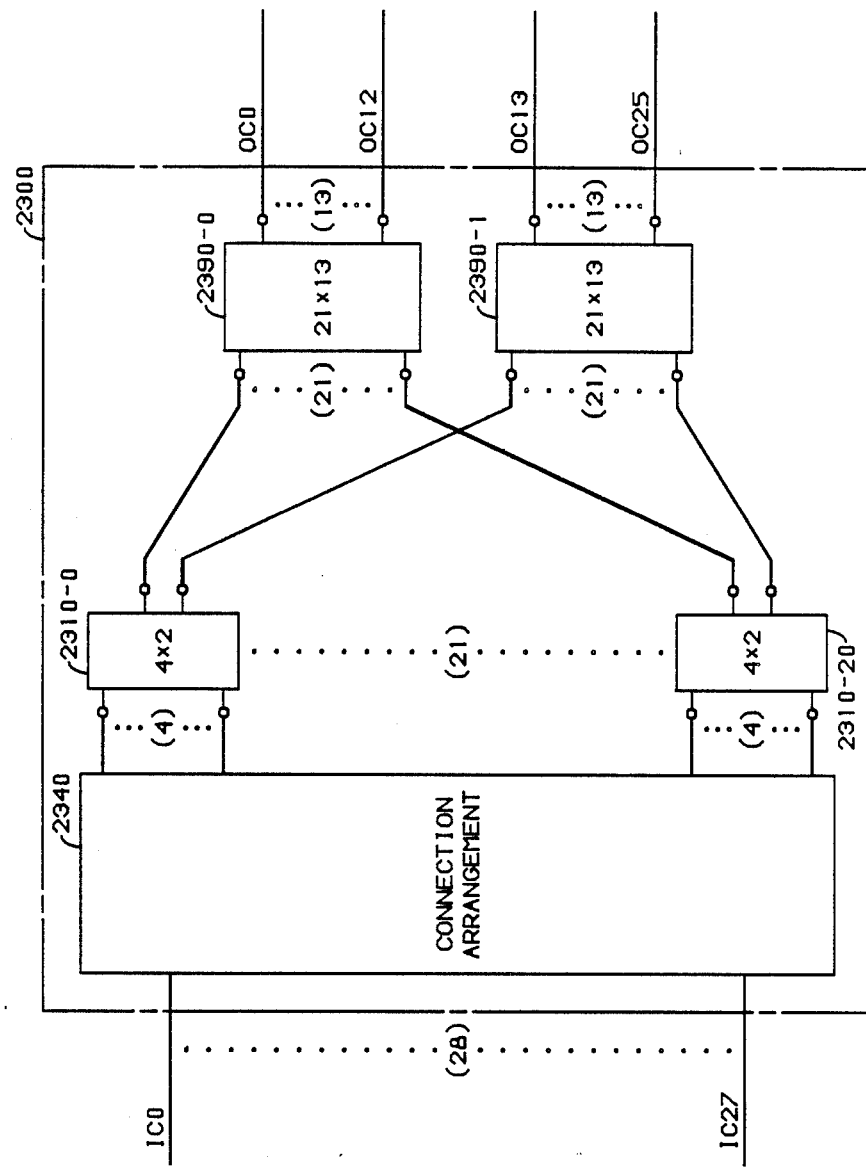
Figure 20:
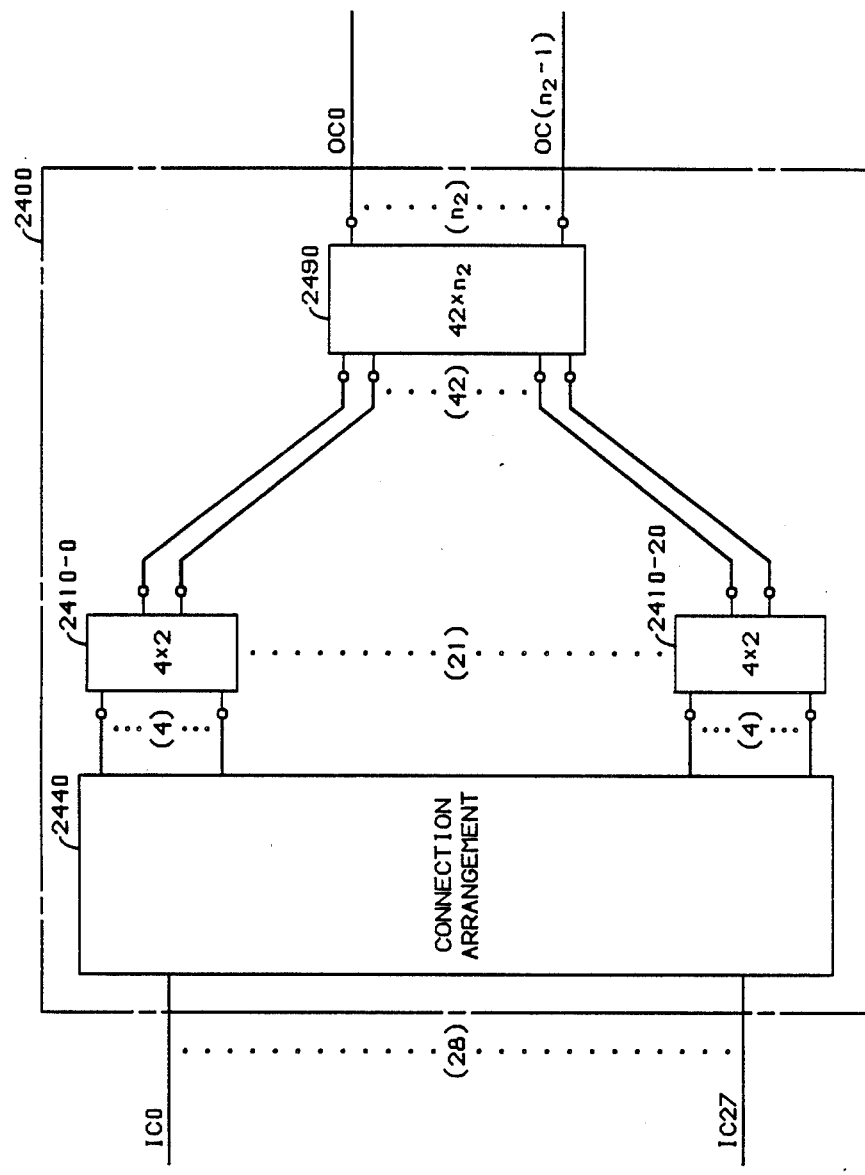
Figure 21:
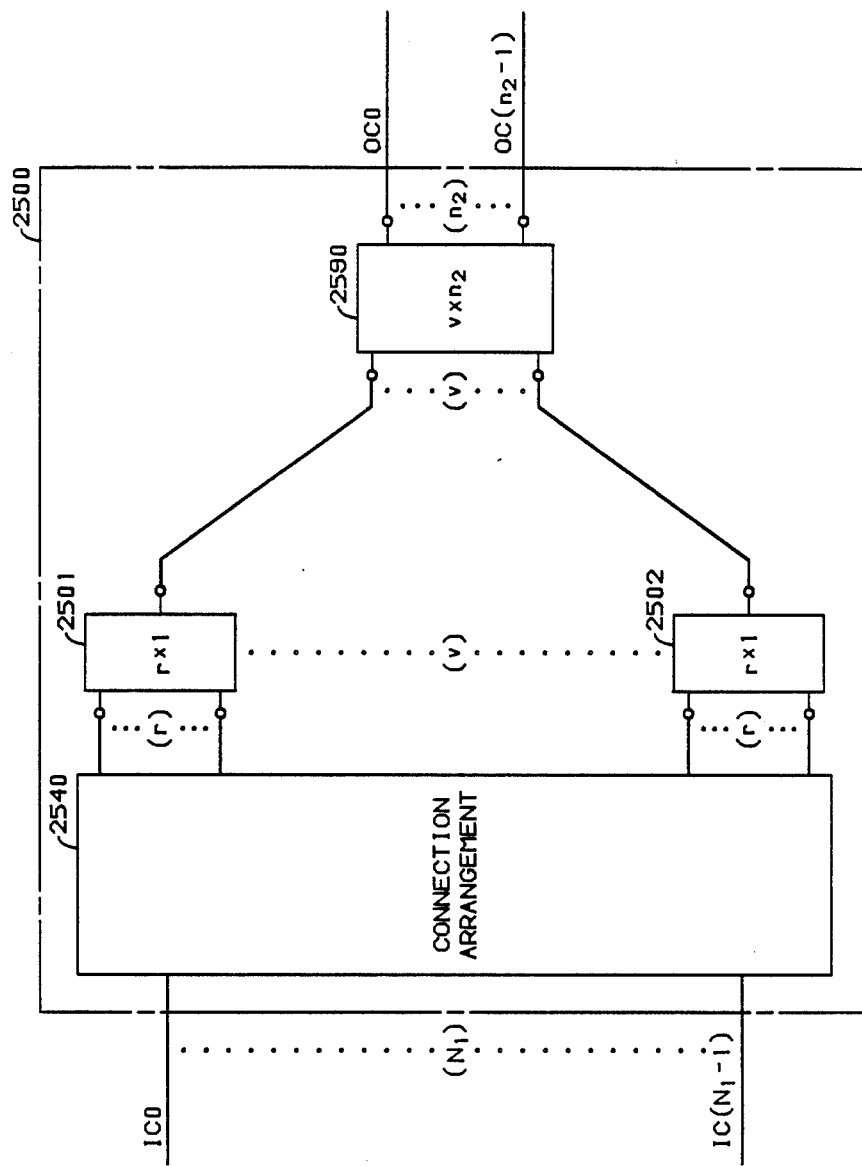

FIGS. 4 through 6 block diagrams of networks that are extensions and generalizations of the network of FIG. 1;

FIG. 7 block diagram of a two-stage, rearrangeable broadcast network constructed based on an orthogonal array shown in FIG. 8;

FIG. 8 is an orthogonal array;

FIG. 9 shows a connection matrix used as an intermediate step in the construction of the network of FIG. 7;

FIG. 10 is a block diagram of an alternative construction of a network that is equivalent to the network of FIG. 7;

FIGS. 11 through 13 are block diagrams of networks that are extensions and generalizations of the network of FIG. 7;

FIG. 14 is a block diagram of a two-stage, rearrangeable broadcast network constructed based on two difference sets shown in FIG. 15;

FIG. 15 is two difference sets;

FIG. 16 shows a difference table for one of the difference sets of FIG. 15;

FIG. 17 shows a connection matrix used as an intermediate step in the construction of the network of FIG. 14;

FIG. 18 is a block diagram of an alternative construction of a network that is equivalent to the network of FIG. 14;

FIGS. 19 through 21 are block diagrams of networks that are extensions and generalizations of the network of FIG. 14; and FIGS. 22 through 27 are block diagrams of alternative constructions of networks that are equivalent to the networks of FIGS. 4, 5, 11, 12, 19 and 20, respectively.

DETAILED DESCRIPTION

Network Constructions Based on Block Designs

Figures 2, 3:
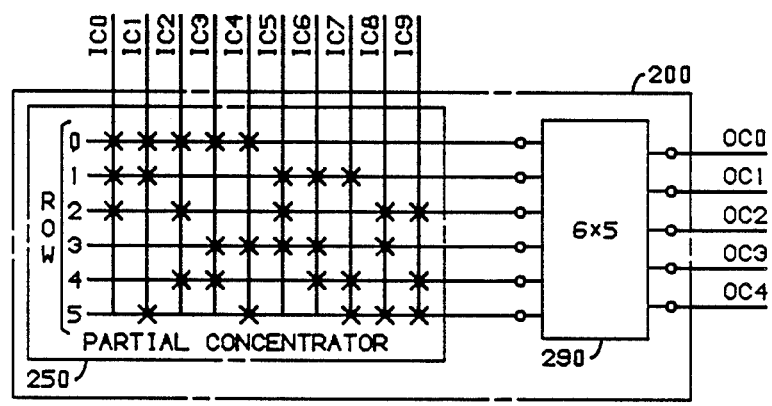
FIG. 2 is a block design.
FIG. 3 is a block diagram of an alternative construction of a network that is equivalent to the network of FIG. 1.

FIG. 1 is a block diagram of a two-stage, rearrangeable broadcast network 100 constructed based on a combinatorial design referred to as a block design. FIG. 2 shows the particular block design used to construct network 100. A block design is characterized by five parameters: b, c, r, M and w. In a (b,c,r,M,w) block design, b elements are used to construct the rows or blocks, there are a total of c rows, each element appears a total of r times in the c rows, each row has M elements, and every subset of two elements appears in exactly w rows. For the (6,10,5,3,2) block design of FIG. 2, six elements 0, 1, 2, 3, 4 and 5 are used to construct the rows, there are a total of ten rows, each element appears a total of five times in the ten rows, each row has three elements, and every subset of two elements appears in exactly two rows. Block designs are well known combinatorial structures. The mathematical properties of block designs and the techniques for constructing such designs are described, for example, in Chapters 10 and 15 and Appendix I of the book by Marshall Hall, Jr., *Combinatorial Theory*, Second Edition (1986), John Wiley & Sons.

Network 100 (FIG. 1) is used to broadcast video signals from ten video vendors, e.g., 151 and 152, to five customer facilities 171 through 175. Network 100 receives video signals in 10 input channels IC0 through IC9 and transmits video signals in five output channels OC0 through OC4 each connected to one of the customer facilities 171 through 175. Each of the customer facilities 171 through 175 includes a receiver, e.g., 171-R, for receiving the output channel video signals and a channel selector, e.g., 171-CS, which transmits connection requests via a communication path 181 to a network controller 180 included in network 100.

Network 100 includes six 5×1 first stage switches 110-0 through 110-5, each having five inlets and one outlet, and a single 6×5 second stage switch 190 having each of six inlets connected to an associated one of the first stage switches 110-0 through 110-5 and having each of five outlets connected to one of the output channels OC0 through OC4. The ten input channels are connected to the 30 first stage switch inlets by a connection arrangement 140. Connection arrangement 140 connects each first stage switch inlet to an associated predetermined one of the input channels IC0 through IC9 in accordance with the (6,10,5,3,2) block design of FIG. 2. (Only the connections from input channel IC0 are explicitly shown in FIG. 1). In the block design, the first stage switches 110-0 through 110-5 have the unique switch designations 0 through 5, respectively. The switch designations in a given row of the block design define the ones of the first stage switches connected to a given input channel associated with the given row. For example, row 0 defines that switches 110-0, 110-1 and 110-2 having switch designations 0, 1 and 2 are connected to input channel IC0. Row 1 defines that switches 110-0, 110-1 and 110-5 having switch designations 0, 1 and 5 are connected to input channel IC1. Row 2 defines that switches 110-0, 110-2 and 110-4 having switch designations 0, 2 and 4 are connected to input channel IC2, etc. Several observations can be made concerning connection arrangement 140. First, each of the input channels IC0 through IC9 is connected to exactly three first stage switch inlets. Input channel IC0, for example, is connected to inlets of first stage switches 110-0, 110-1 and 110-2. Second, no pair of first stage switches intersect in more than two input channels. (A switch is said to be incident to an input channel if the input channel is connected to the switch. If two switches are incident to the same input channel, they are said to intersect in that input channel.) For example, first stage switches 110-0 and 110-1 intersect in only input channels IC0 and IC1. An important characteristic of connection arrangement 140 can be stated as follows. For any group of five of the input channels IC0 through IC9, there is a group of five of the first stage switches 110-0 through 110-5, each having one inlet connected to a different one of that group of input channels. For example, consider the group of input channels IC0, IC2, IC5, IC7, and IC8. Each switch of the group of first stage switches 110-0, 110-2, 110-3, 110-4 and 110-5 has one inlet connected to a different one of that group of input channels. Switch 110-0 has an inlet connected to input channel IC0, switch 110-2 has an inlet connected to input channel IC2, switch 110-3 has an inlet connected to input channel IC5, switch 110-4 has an inlet connected to input channel IC7 and switch 110-5 has an inlet connected to input channel IC8. It is possible that for certain sequences of the customer facilities 171 through 175 transmitting connection requests for input channels IC0, IC2, IC5, IC7 and IC8, network 100 may temporarily block one or more of the requested input channels. However, it is always possible to rearrange the connections of the first stage switches such that switches 110-0, 110-2, 110-3, 110-4 and 110-5 connect input channels IC0, IC2, IC5, IC7 and IC8, respectively, to inlets of second stage switch 190. The connections within the second stage switch 190 can then be rearranged such that the input channels IC0, IC2, IC5, IC7 and IC8 are connected to the customer facilities 171 through 175 in accordance with the connection requests. Since this is possible for any group of five of the input channels IC0 through IC9, network 100 is a rearrangeable broadcast network. The arrangement of connections within the six first stage switches 110-0 through 110-5 and the second stage switch 190 is controlled by network controller 180 via two communication paths 182 and 183.

FIG. 3 is a block diagram of a two-stage, rearrangeable broadcast network 200 that is equivalent to network 100. The 6×5 second stage switch 290 of network 200 is identical to second stage switch 190 of network 100. However the connection arrangement 140 and first stage switches 110-0 through 110-5 of network 100 are replaced with a partial concentrator 250 in network 200. Partial concentrator 250 comprises ten columns connected to the input channels IC0 through IC9, and six rows connected to the six inlets of second stage switch 290. In a partial concentrator, a column is said to be incident to a row if there is a crosspoint at the intersection. Similarly, a row is said to be incident to a column if there is a crosspoint at the intersection. In concentrator 250, each of the columns is incident to the rows defined by a corresponding row of the (6,10,5,3,2) block design of FIG. 2. For example, the column connected to input channel IC0 is incident to rows 0, 1 and 2, the column connected to input channel IC1 is incident to rows 0, 1 and 5, etc.

FIG. 4 is a block diagram of a two-stage rearrangeable broadcast network 300 constructed by extending network 100 previously described. Network 300 is used to interconnect 10 input channels IC0 through IC9 to 15 output channels OC0 through OC14. Connection arrangement 340 of network 300 is identical to connection arrangement 140 of network 100. Six first stage switches 310-0 through 310-5 are each 5×3 rectangular switches in contrast to the six 5×1 first stage switches 110-0 through 110-5 of network 100. Network 300 also includes three 6×5 rectangular second stage switches 390-0, 390-1 and 390-2 each identical to the one second stage switch 190 of network 100.

FIG. 5 is a block diagram of a two-stage rearrangeable broadcast network 400 representing another extension of the network 100 construction. Network 400 is used to interconnect 10 input channels IC0 through IC9 to $n_2$ output channels OC0 through OC($n_2-1$). Connection arrangement 440 of network 400 is identical to connection arrangement 140 of network 100 and connection arrangement 340 of network 300. Six 5×3 first stage switches 410-0 through 410-5 of network 400 are identical to first stage switches 310-0 through 310-5 of network 300. However, in network 400, all three outlets of each first stage switch are connected to an 18×$n_2$ rectangular second stage switch 490. By having multiple links from each first stage switch to second stage switch 490, network 400 can serve greater than five output channels and still be rearrangeable to avoid blocking. More generally, each first stage switch could have x links to the second stage switch.

FIG. 6 is a block diagram of a generalized, two-stage broadcast network 500 constructed from a (b,c,r,M,w) block design. Network 500 is used to interconnect $N_1$ input channels IC0 through IC($N_1-1$) to $n_2$ output channels OC0 through OC($n_2-1$). Network 500 includes v, r×1 first stage switches, e.g., 501, 502, a v×$n_2$ second stage switch 590, and a connection arrangement 540. Connection arrangement 540 connects each of the inlets of the first stage switches to an associated predetermined one of the input channels in accordance with a (b,c,r,M,w) block design. Each of the first stage switches has a unique switch designation. The elements of the block design are the switch designations of the first stage switches and the switch designations in a given row of the block design define the ones of the first stage switches connected to a given input channel associated with a given row. The construction parameters for network 500 are summarized in Table 1.

TABLE 1
CONSTRUCTION PARAMETERS FOR NETWORK 500

A (b,c,r,M,w) block design is used to construct connection arrangement 540.
$N_1 > 1$, $n_2 > 1$, $n_2 \leq N_1$, $v \geq n_2$, $r > 1$,
$b \geq v$, $c \geq N_1$, $M > 1$, $w > 0$, $M + w > 3$ Note that b is at least equal to v, the number of first stage switches, and c is at least equal to $N_1$, the number of input channels. Networks can be derived from network 500 for serving fewer input channels by deleting rows of the block design and, if possible, eliminating first stage switches. Each of the input channels IC0 through IC($N_1$−1) is connected to exactly M first stage switch inlets. No pair of first stage switches intersect in more than w input channels. (This property is referred to as the w-intersect property.) For any group of $n_2$ of the input channels IC0 through IC($N_1$−1), there is a group of $n_2$ of the first stage switches, e.g., 501, 502, each having one inlet connected to a different one of that group of input channels. It has been determined by mathematical analysis that network 500 is a rearrangeable, broadcast network where $n_2$ is at most equal to $$\lceil (M^2-1)/w \rceil +1 \tag{1}$$

where $\lceil y \rceil$ denotes the smallest integer not less than y. Of course network 500 can be extended to serve a greater number, $n_2$, of output channels by having multiple links between each first stage switch and the second stage switch as in network 400 (FIG. 5). If there are x links between each first stage switch and the second stage switch, the network is a rearrangeable, broadcast network where $n_2$ is at most equal to $$x[\lceil (xM+1)(M-1)/w \rceil +1]. \tag{2}$$

Network 500 can also be extended by having multiple second stage switches as in network 300 (FIG. 4).

Figure 22:
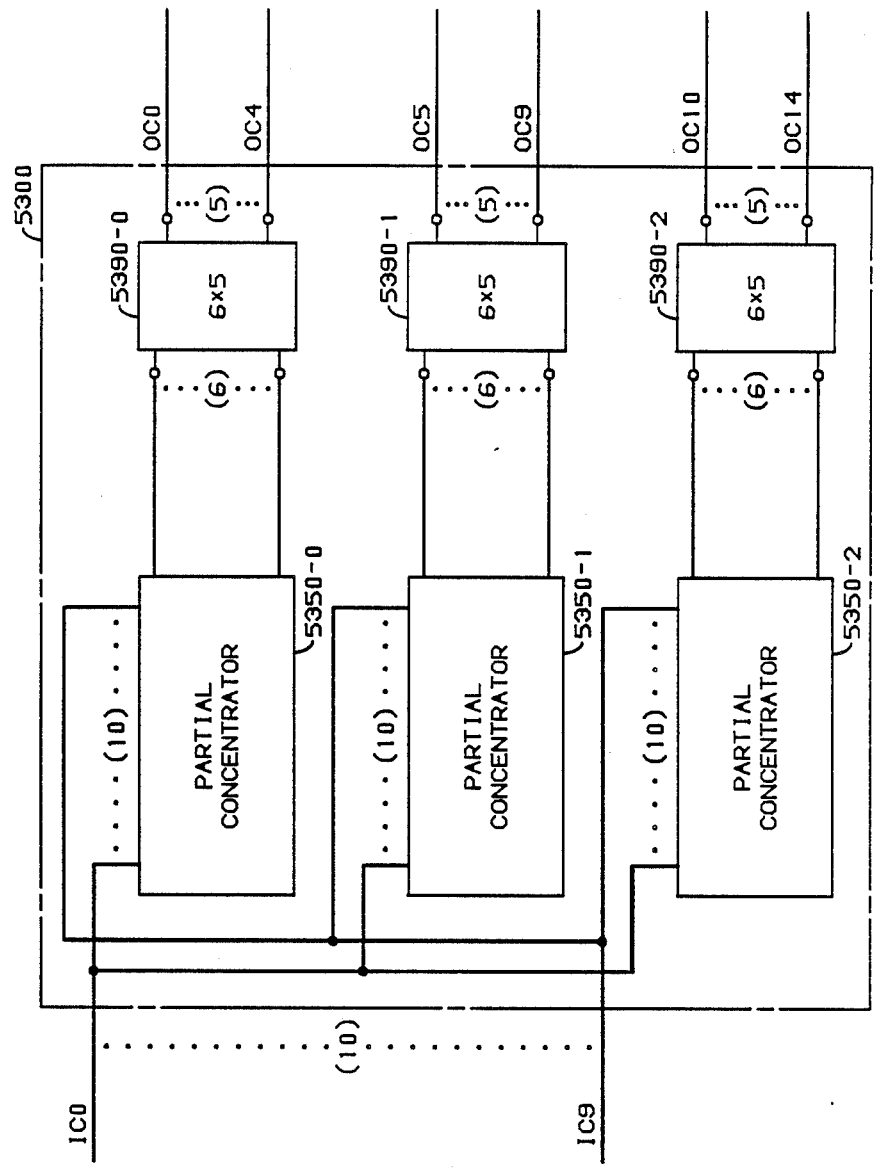

FIG. 22 is a block diagram of a two-stage, rearrangeable broadcast network 5300 that is equivalent to network 300 (FIG. 4). The 6×5 rectangular switches 5390-0, 5390-1, and 5390-2 are identical to the second stage switches 390-0, 390-1, and 390-2 of network 300. However the connection arrangement 340 and first stage switches 310-0 through 310-5 of network 300 are replaced with three identical partial concentrators 5350-0, 5350-1, and 5350-2 in network 5300. Each of the partial concentrators 5350-0, 5350-1, and 5350-2 is identical to partial concentrator 250 of network 200 (FIG. 3). Of course the three partial concentrators 5350-0, 5350-1, and 5350-2 can also be represented as a single larger partial concentrator. Further the rows of the single larger partial concentrator can be reordered arbitrarily for practical design considerations, for example such that identical rows are consecutive.

Figure 23:
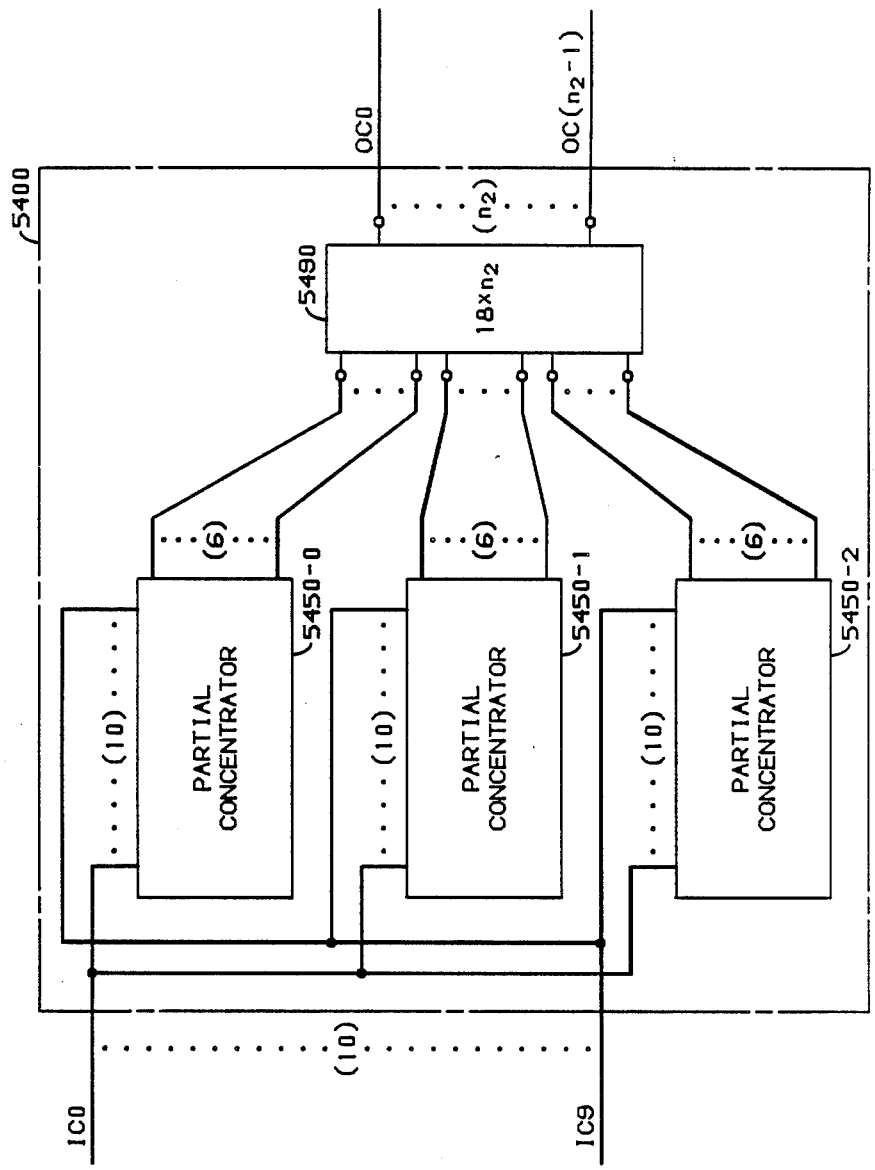

FIG. 23 is a block diagram of a two-stage, rearrangeable broadcast network 5400 that is equivalent to network 400 (FIG. 5). The 18×$n_2$ rectangular switch 5490 is identical to second stage switch 490 of network 400. However the connection arrangement 440 and first stage switches 410-0 through 410-5 of network 400 are replaced with three (or, more generally, x) identical partial concentrators 5450-0, 5450-1, and 5450-2 in network 5400. Each of the partial concentrators 5450-0, 5450-1, and 5450-2 is identical to partial concentrator 250 of network 200 (FIG. 3).

Network Constructions Based on Orthogonal Arrays

FIG. 7 is a block diagram of a two-stage, rearrangeable broadcast network 1100 constructed based on a combinatorial design referred to as an orthogonal array. FIG. 8 shows the particular orthogonal array used to construct network 1100. An orthogonal array of order N and depth M is a matrix with M rows and $N^2$ columns in which cells are occupied by N distinct symbols and where every pair of rows is orthogonal, i.e., the $N^2$ columns produce $N^2$ pairs of elements from any two rows, where those $N^2$ pairs include all $N^2$ ordered pairs of the N distinct symbols. The orthogonal array of FIG. 8 is a matrix of order four and depth three having the four distinct symbols 0, 1, 2 and 3. Rows 0 and 2, for example, are orthogonal because the 16 columns produce the 16 ordered pairs of elements: (0,0), (0,1), (0,2), (0,3), (1,1), (1,0), (1,3), (1,2), (2,2), (2,3), (2,0), (2,1), (3,3), (3,2), (3,1), (3,0). Similarly, rows 0 and 1 are orthogonal and rows 1 and 2 are orthogonal. Orthogonal arrays are well known combinatorial structures. The mathematical properties of orthogonal arrays and the techniques for constructing such arrays are described, for example, in Chapter 13 of the above-referenced book by Hall.

The 3×16 connection matrix shown in FIG. 9 is used as an intermediate step in the construction of network 1100. The matrix of FIG. 9 is obtained from the orthogonal array of FIG. 8 by adding four to each element of row 1 and eight to each element of row 2. In general, iN is added to each element of row i.

Network 1100 (FIG. 7) is used to broadcast video signals from 32 video vendors, e.g., 1151 and 1152, to six customer facilities 1171 through 1176. Network 1100 receives video signals in 32 input channels IC0 through IC31 and transmits video signals in six output channels OC0 through OC5 each connected to one of the customer facilities 1171 through 1176. Each of the customer facilities 1171 through 1176 includes a receiver, e.g., 1171-R, for receiving the output channel video signals and a channel selector, e.g., 1171-CS, which transmits connection requests via a communication path 1181 to a network controller 1180 included in network 1100.

Network 1100 includes 12, 8×1 first stage switches 1110-0 through 1110-11, each having eight inlets and one outlet, and a single 12×6 second stage switch 1190 having each of 12 inlets connected to an associated one of the first stage switches 1110-0 through 1110-11 and having each of six outlets connected to one of the output channels OC0 through OC5. The 32 input channels are connected to the 96 first stage switch inlets by a connection arrangement 1140. Connection arrangement 1140 connects each first stage switch inlet to an associated predetermined one of the input channels IC0 through IC31 in accordance with the 3×16 connection matrix of FIG. 9. Each of the 16 columns of the connection matrix is associated with two of the input channels IC0 through IC31. For example, column 0 is associated with input channels IC0 and IC16, column 1 is associated with input channels IC1 and IC17, column 2 is associated with input channels IC2 and IC18, etc. Each first stage switch has a unique switch designation 0, 1, 2 ... 11. A given column of the connection matrix defines that the input channels associated with the given column are connected to the first stage switches having designations in the given column. Column 0 defines that input channels IC0 and IC16 are connected to first stage switches 1110-0, 1110-4 and 1110-8 having designations 0, 4 and 8 respectively. Column 1 defines that input channels IC1 and IC17 are connected to first stage switches 1110-0, 1110-5 and 1110-9 having designations 0, 5 and 9, respectively. Column 2 defines that input channels IC2 and IC18 are connected to first stage switches 1110-0, 1110-6 and 1110-10 having designations 0, 6 and 10, respectively, etc. Several observations can be made concerning connection arrangement 1140. First, each of the input channels IC0 through IC31 is connected to exactly three first stage switch inlets. Input channel IC0, for example, is connected to inlets of first stage switches 1110-0, 1110-4 and 1110-8. Second, no pair of first stage switches intersect in more than two input channels. An important characteristic of connection arrangement 1140 can be stated as follows. For any group of six of the input channels IC0 through IC31, there is a group of six of the first stage switches 1110-0 through 1110-11, each having one inlet connected to a different one of that group of input channels. For example, consider the group of input channels IC0, IC4, IC8, IC12, IC16 and IC18. Each switch of the group of first stage switches 1110-0, 1110-1, 1110-2, 1110-3, 1110-4 and 1110-6 has one inlet connected to a different one of that group of input channels. Switch 1110-0 has an inlet connected to input channel IC0, switch 1110-1 has an inlet connected to input channel IC4, switch 1110-2 has an inlet connected to input channel IC8, switch 1110-3 has an inlet connected to input channel IC12, switch 1110-4 has an inlet connected to input channel IC16 and switch 1110-6 has an inlet connected to input channel IC18. It is possible that for certain sequences of the customer facilities 1171 through 1176 transmitting connection requests for input channels IC0, IC4, IC8, IC12 and IC16, network 1100 may temporarily block one or more of the requested input channels. However, it is always possible to rearrange the connections of the first stage switches such that switches 1110-0, 1110-1, 1110-2, 1110-3, 1110-4 and 1110-6 connect input channels IC0, IC4, IC8, IC12, IC16, and IC18, respectively, to inlets of second stage switch 1190. The connections within the second stage switch 1190 can then be rearranged such that the input channels IC0, IC4, IC8, IC12, IC16 and IC18 are connected to the customer facilities 1171 through 1176 in accordance with the connection requests. Since this is possible for any group of six of the input channels IC0 through IC31, network 1100 is a rearrangeable broadcast network. The arrangement of connections within the 12 first stage switches 1110-0 through 1110-11 and the second stage switch 1190 is controlled by network controller 1180 via two communication paths 1182 and 1183.

FIG. 10 is a block diagram of a two-stage, rearrangeable broadcast network 1200 that is equivalent to network 1100. The 12×6 second stage switch 1290 of network 1200 is identical to second stage switch 1190 of network 1100. However the connection arrangement 1140 and first stage switches 1110-0 through 1110-5 of network 1100 are replaced with a partial concentrator 1250 in network 1200. Partial concentrator 1250 comprises 32 columns connected to the input channels IC0 through IC31, and 12 rows connected to the 12 inlets of second stage switch 1290. Partial concentrator 1250 includes two copies of a 16-column partial concentrator. The 12 rows comprise three sets of four rows. For any integer i, $0 \leq i \leq 3$, and any integer j, $0 \leq j \leq 2$, row i of set j is incident to columns corresponding to columns of the orthogonal array of FIG. 8, which in row j of the array, contain symbols defining row i. For example, row 0 of set 0 is incident to columns 0, 1, 2 and 3 since columns 0, 1, 2 and 3 of the orthogonal array of FIG. 8 have the symbol 0 in row 0. Similarly, row 3 of set 1 is incident to columns 3, 7, 11 and 15 since columns 3, 7, 11 and 15 of the orthogonal array have the symbol 3 in row 1. Note that the crosspoint pattern of columns 16 through 31 of partial concentrator 1250 is identical to that for columns 0 through 15.

A partial concentrator is called resolvable if its rows can be partitioned into M groups such that each column is incident to exactly one row in each group. Partial concentrator 1250 is resolvable since its rows can be partitioned into three groups such that each column is incident to exactly one row in each group.

FIG. 11 is a block diagram of a two-stage rearrangeable broadcast network 1300 constructed by extending network 1100 previously described. Network 1300 is used to interconnect 32 input channels OC0 through OC31 to 18 output channels OC0 through OC17. Connection arrangement 1340 of network 1300 is identical to connection arrangement 1140 of network 1100. Twelve first stage switches 1310-0 through 1310-11 are each 8×3 rectangular switches in contrast to the twelve 8×1 first stage switches 1110-0 through 1110-11 of network 1100. Network 1300 also includes three 12×6 rectangular second stage switches 1390-0, 1390-1 and 1390-2 each identical to the one second stage switch 1190 of network 1100.

FIG. 12 is a block diagram of a two-stage rearrangeable broadcast network 1400 representing another extension of the network 1100 construction. Network 1400 is used to interconnect 32 input channels IC0 through IC31 to $n_2$ output channels OC0 through OC($n_2-1$). Connection arrangement 1440 of network 1400 is identical to connection arrangement 1140 of network 1100 and connection arrangement 1340 of network 1300. Twelve 8×3 first stage switches 1410 through 1410-11 are identical to first stage switches 1310-0 through 1310-11 of network 1300. However, in network 1400, all three outlets of each first stage switch are connected to a $36 \times n_2$ rectangular second stage switch 1490. By having multiple links from each first stage switch to second stage switch 1490, network 1400 can serve greater than six output channels and still be rearrangeable to avoid blocking. More generally, each first stage switch could have x links to the second stage switch.

FIG. 13 is a block diagram of a generalized, two-stage broadcast network 1500 constructed from an orthogonal array of order N and depth M. Network 1500 is used to interconnect $N_1$ input channels IC0 through IC($N_1-1$) to $n_2$ output channels OC0 through OC($n_2-1$). Network 1500 includes v, r×1 first stage switches, e.g., 1501, 1502, a v×$n_2$ second stage switch 1590, and a connection arrangement 1540. Connection arrangement 1540 connects each of the inlets of the first stage switches to an associated predetermined one of the input channels in accordance with a $M \times N^2$ connection matrix. The first stage switches have unique switch designations $d_0, d_1, \ldots d_{v-1}$. For any integer i, $0 \leq i \leq M-1$, the elements of row i of the connection matrix are obtained by adding iN to corresponding elements of an orthogonal array of order N and depth M. The orthogonal array has symbols $0, 1, \ldots N-1$. Each column of the matrix is associated with w of the input channels. Each element e of a given column of the matrix defines that the input channels associated with the given column are connected to the first stage switch having the switch designation $d_e$. The construction parameters for network 1500 are summarized in Table 2.

TABLE 2
CONSTRUCTION PARAMETERS FOR NETWORK 1500

A M × N² connection matrix corresponding to an orthogonal array of order N and depth M is used to construct connection arrangement 1540. Each column of the connection matrix is associated with w input channels.
$N_1 > 1$, $n_2 > 1$, $n_2 \leq N_1$, $v \leq n_2$, $r > 1$,
$M > 1$, $N > 1$, $w > 1$, $wN^2 \geq N_1$, $MN \geq v$,
$wN = r$ Networks can be derived from network 1500 for serving fewer input channels by deleting columns of the connection matrix and, if possible, eliminating first stage switches. Each of the input channels IC0 through IC($N_1-1$) is connected to exactly M first stage switch inlets. No pair of first stage switches intersect in more than w input channels (the w-intersect property). For any group of $n_2$ of the input channels IC0 through IC($N_1-1$), there is a group of $n_2$ of the first stage switches, e.g., 1501, 1502, each having one inlet connected to a different one of that group of input channels. It has been determined by mathematical analysis that network 1500 is assured to be a rearrangeable, broadcast network by having $n_2$ at most equal to $$(M-1)(\lceil M/w \rceil + 1) + \lfloor M/w \rfloor \quad (3)$$

where $\lceil y \rceil$ denotes the smallest integer not less than y and $\lfloor z \rfloor$ denotes the largest integer not exceeding z. Of course network 1500 can be extended to serve a greater number, $n_2$, of output channels by having multiple links between each first stage switch and the second stage switch as in network 1400 (FIG. 12). If there are x links between each first stage switch and the second stage switch, the network is a rearrangeable, broadcast network where $n_2$ at most equal to $$x \lfloor A/B + 1 \rfloor, \quad (4)$$

where $A = w(M-1)(\lceil xM/w \rceil + 1)^2$ and
$B = w(\lceil xM/w \rceil + 1) - x$.

Network 1500 can also be extended by having multiple second stage switches as in network 1300 (FIG. 11).

Figure 24:
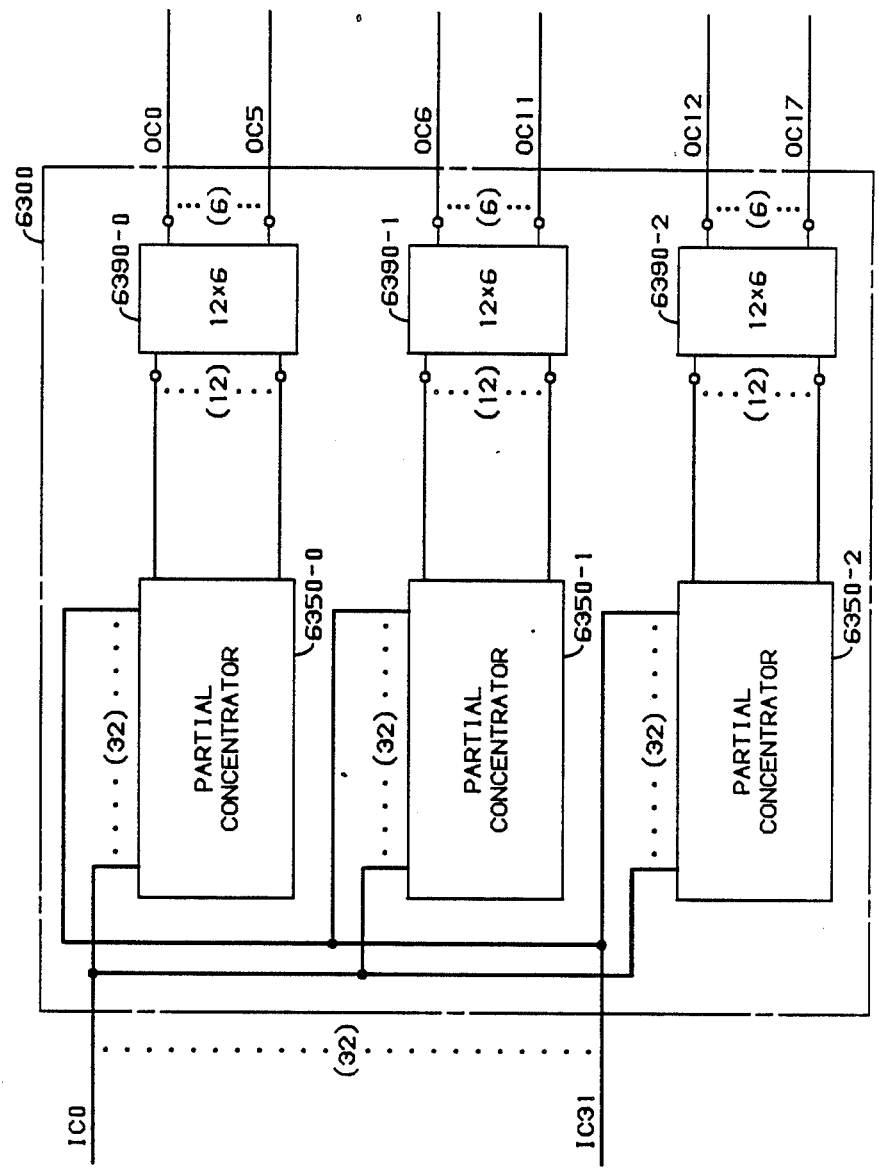

FIG. 24 is a block diagram of a two-stage, rearrangeable broadcast network 6300 that is equivalent to network 1300 (FIG. 11). The 12×6 rectangular switches 6390-0, 6390-1, and 6390-2 are identical to the second stage switches 1390-0, 1390-1, and 1390-2 of network 1300. However the connection arrangement 1340 and first stage switches 1310-0 through 1310-11 of network 1300 are replaced with three identical partial concentrators 6350-0, 6350-1, and 6350-2 in network 6300. Each of the partial concentrators 6350-0, 6350-1, and 6350-2 is identical to partial concentrator 1250 of network 1200 (FIG. 10). Of course the three partial concentrators 6350-0, 6350-1, and 6350-2 can also be represented as a single larger partial concentrator. Further the rows of the single larger partial concentrator can be reordered arbitrarily for practical design considerations, for example such that identical rows are consecutive.

Figure 25:
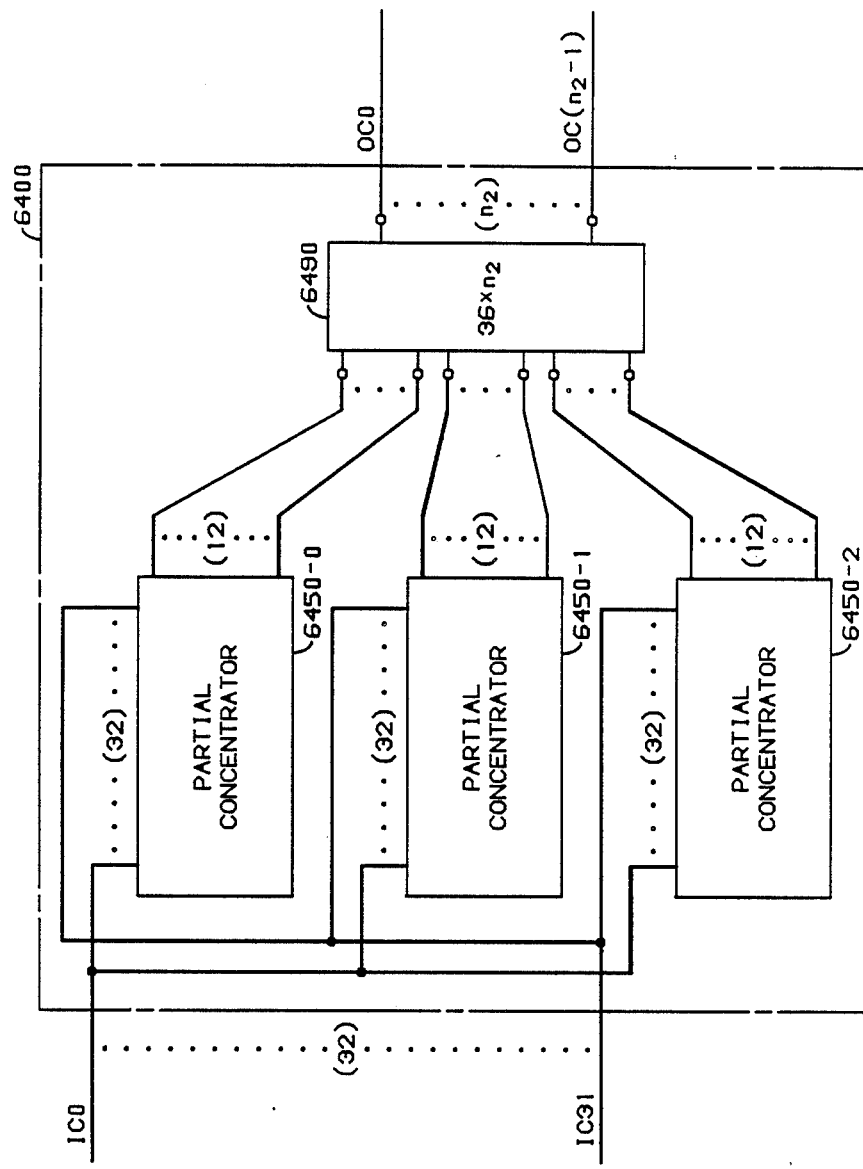

FIG. 25 is a block diagram of a two-stage, rearrangeable broadcast network 6400 that is equivalent to network 1400 (FIG. 12). The 36×$n_2$ rectangular switch 6490 is identical to second stage switch 1490 of network 1400. However the connection arrangement 1440 and first stage switches 1410-0 through 1410-11 of network 1400 are replaced with three (or, more generally, x) identical partial concentrators 6450-0, 6450-1, and 6450-2 in network 6400. Each of the partial concentrators 6450-0, 6450-1, and 6450-2 is identical to partial concentrator 1250 of network 1200 (FIG. 10).

Network Constructions Based on Difference Sets

FIG. 14 is a block diagram of a two-stage, rearrangeable broadcast network 2100 constructed based on a combinatorial design referred to as a difference set. FIG. 15 shows two particular difference sets $D_1$ and $D_2$ used to construct network 2100. A set of r residues D:$\{a_1, \ldots, a_r\}$ modulo u is called a (u,r,w) difference set if for every $d \not\equiv 0$ (modulo u), there are exactly w ordered pairs $(a_i, a_j)$, where $a_i$ and $a_j$ are elements of D such that $a_i - a_j \equiv d$ (modulo u). A difference table for the (7,4,2) difference set $D_1$ is shown in FIG. 16. The rows and columns of the difference table are labelled with the elements 0, 2, 3 and 4 of $D_1$. Each cell entry of the difference table is the difference resulting from the modulo 7 subtraction of the column heading from the row heading. Note that in the difference table of FIG. 16, every number from 1 to 6 appears exactly twice. In general, the cell entries in the difference table for a (u,r,w) difference set are calculated modulo u, every number from 1 to u−1 appears exactly w times in the difference table, and the difference set has r elements. Difference sets are well known combinatorial structures. The mathematical properties of difference sets and the techniques for constructing such designs are described, for example, in Chapter 11 of the above-referenced book by Hall, and the publication of Leonard D. Baumert, *Cyclic Difference Sets*, (1971), Springer-Verlag.

Network 2100 is constructed from the two (7,4,2) difference sets $D_1$ and $D_2$ shown in FIG. 15. $D_2$ is obtained from $D_1$ by multiplying modulo 7 each of the elements of $D_1$ by two. The 21×4 connection matrix shown in FIG. 17 is used as an intermediate step in the construction of network 2100. The matrix of FIG. 17 is obtained from the difference sets $D_1$ and $D_2$ as follows. The 21 rows of the matrix comprise three sets, $s_0$, $s_1$ and $s_2$, each having seven rows. Each of the numbers 0, 1, . . . ,27 is placed arbitrarily in the set $s_0$. The columns of $s_1$ are determined from $D_1 = \{0,2,3,4\}$ as follows. Column 0 of $s_1$ is the same as column 0 of $s_0$. Column 1 of $s_1$ is obtained by rotating column 1 of $s_0$ by 2 positions. Column 2 of $s_1$ is obtained by rotating column 2 of $s_0$ by 3 positions. Column 3 of $s_1$ is obtained by rotating column 3 of $s_0$ by 4 positions. The columns of $s_2$ are determined from $D_2 = \{0,4,6,1\}$ as follows. Column 0 of $s_2$ is the same as column 0 of $s_0$. Column 1 of $s_2$ is obtained by rotating column 1 of $s_0$ by 4 positions. Column 2 of $s_2$ is obtained by rotating column 2 of $s_0$ by 6 positions. Column 3 of $s_2$ is obtained by rotating column 3 of $s_0$ by 1 position.

Network 2100 (FIG. 14) is used to broadcast video signals from 28 video vendors, e.g., 2151 and 2152, to 13 customer facilities 2161 through 2173. Network 2100 receives video signals in 28 input channels IC0 through IC27 and transmits video signals in 13 output channels OC0 through OC12 each connected to one of the customer facilities 2161 through 2173. Each of the customer facilities 2161 through 2173 includes a receiver, e.g., 2161-R, for receiving the output channel video signals and a channel selector, e.g., 2161-CS, which transmits connection requests via a communication path 2181 to a network controller 2180 included in network 2100.

Network 2100 includes 21, 4×1 first stage switches 2110-0 through 2110-20, each having four inlets and one outlet, and a single 21×13 second stage switch 2190 having each of 21 inlets connected to an associated one of the first stage switches 2110-0 through 2110-20 and having each of 13 outlets connected to one of the output channels OC0 through OC12. The 28 input channels are connected to the 84 first stage switch inlets by a connection arrangement 2140 Connection arrangement 2140 connects each first stage switch inlet to an associated predetermined one of the input channels IC0 through IC27 in accordance with the 21×4 connection matrix of FIG. 17. The elements of the matrix are the channel designations 0,1, . . . ,27 of the input channels IC0 through IC27. Each of the 21 rows of the matrix is associated with one of the 21 first stage switches. The channel designations occurring in a given row of the matrix define the ones of the input channels connected to the inlets of the first stage switch associated with the given row. For example, row 0 defines that input channels IC0, IC7, IC14, and IC21 are connected to first stage switch 2110-0. Row 1 defines that input channels IC1, IC8, IC15, and IC22 are connected to first stage switch 2110-1. Row 2 defines that input channels IC2, IC9, IC16, and IC23 are connected to first stage switch 2110-2, etc. Several observations can be made concerning connection arrangement 2140. First, each of the input channels IC0 through IC27 is connected to exactly three first stage switch inlets. Input channel IC0, for example, is connected to inlets of first stage switches 2110-0, 2110-7 and 2110-14. Second, considering the first stage switches in three groups 2110-0 through 2110-6, 2110-7 through 2110-13, and 2110-14 through 2110-20, for any two first stage switches in a given group there are at most two first stage switches in each other group that intersect both of the two first stage switches in the given group. An important characteristic of connection arrangement 2140 can be stated as follows. For any group of 13 of the input channels IC0 through IC27, there is a group of 13 of the first stage switches 2110-0 through 2110-20, each having one inlet connected to a different one of that group of input channels. For example, consider the group of 13 input channels IC0 through IC12. Each switch of the group of 13 first stage switches 2110-0 through 2110-6, 2110-9 through 2110-13, and 2110-16 has one inlet connected to a different one of that group of input channels. It is possible that for certain sequences of the customer facilities 2161 through 2173 transmitting connection requests for input channels IC0 through IC12, network 2100 may temporarily block one or more of the requested input channels. However, it is always possible to rearrange the connections of the first stage switches such that switches 2110-0 through 2110-6, 2110-9 through 2110-13, and 2110-16 connect input channel IC0 through IC12 to inlets of second stage switch 2190. The connections within the second stage switch 2190 can then be rearranged such that the input channels IC0 through IC12 are connected to the customer facilities 2161 through 2173 in accordance with the connection requests. Since this is possible for any group of 13 of the input channels IC0 through IC27, network 2100 is a rearrangeable broadcast network. The arrangement of connections within the 21 first stage switches 2110-0 through 2110-20 and the second stage switch 2190 is controlled by network controller 2180 via two communication paths 2182 and 2183.

FIG. 18 is a block diagram of a two-stage, rearrangeable broadcast network that is equivalent to network 2100. The 21×13 second stage switch 2290 of network 2200 is identical to second stage switch 2190 of network 2100. However the connection arrangement 2140 and first stage switches 2110-0 through 2110-20 of network 2100 are replaced with a partial concentrator 2250 in network 2200. Partial concentrator 2250 comprises 28 columns connected to the input channels IC0 through IC27, and 21 rows connected to the 21 inlets of second stage switch 2290. In partial concentrator 2250, each of the 21 rows is incident to ones of the 28 columns defined by a corresponding row of the 21×4 connection matrix of FIG. 17. For example, row 0 is incident to columns 0, 7, 14 and 21. Row 1 is incident to columns 1, 8, 15 and 22. Row 2 is incident to columns 2, 9, 16 and 23 etc. The 21 rows of partial concentrator 2250 comprise three sets of seven rows each. Note that for any two rows in a given set, there exists at most two rows in each other set which intersect both of the two rows in the given set.

Partial concentrator 2250 is resolvable since its rows can be partitioned into three groups such that each column is incident to exactly one row in each group. A resolvable concentrator is said to have the w-double-intersect property if for any two rows in a given group there exist at most w rows in each other group that intersect both of the two rows in the given group. Partial concentrator 2250 has the w-double-intersect property with w equal to two.

FIG. 19 is a block diagram of a two-stage rearrangeable broadcast network 2300 constructed by extending network 2100 previously described. Network 2300 is used to interconnect 28 input channels IC0 through IC27 to 26 output channels OC0 through OC25. Connection arrangement 2340 of network 2300 is identical to connection arrangement 2140 of network 2100. Twenty-one first stage switches 2310-0 through 2310-20 are each 4×2 rectangular switches in contrast to the 21, 4×1 first stage switches of network 2100. Network 2300 also includes two 21×13 rectangular second stage switches 2390-0 and 2390-1 each identical to the one second stage switch 2190 of network 2100.

FIG. 20 is a block diagram of a two-stage rearrangeable broadcast network 2400 representing another extension of the network 2100 construction. Network 2400 is used to interconnect 28 input channels IC0 through IC27 to $n_2$ output channels OC0 through OC($n_2-1$). Connection arrangement 2440 of network 2400 is identical to connection arrangement 2140 of network 2100 and connection arrangement 2340 of network 2300. Twenty-one 4×2 first stage switches 2410-0 through 2410-20 are identical to first stage switches 2310-0 through 2310-20 of network 2300. However, in network 2400, both outlets of each first stage switch are connected to a 42×$n_2$ rectangular second stage switch 2490. By having multiple links from each first stage switch to second stage switch 2490, network 2400 can serve greater than 13 output channels and still be rearrangeable to avoid blocking. More generally, each first stage switch could have x links to the second stage switch.

FIG. 21 is a block diagram of a generalized, two-stage broadcast network 2500 constructed from $M-1$ (u,r,w) difference sets. Network 2500 is used to interconnect $N_1$ input channels IC0 through IC($N_1-1$) to $n_2$ output channels OC0 through OC($n_2-1$). Network 2500 includes v, r×1 first stage switches, e.g., 2501, 2502, a v×$n_2$ second stage switch 2590, and a connection arrangement 2540. Connection arrangement 2540 connects each of the inlets of the first stage switches to an associated predetermined one of the input channels in accordance with a Mu×r connection matrix. Each of the input channels has a unique channel designation. The connection matrix is derived from M−1 (u,r,w) difference sets $D_1, D_2, \ldots, D_{M-1}$. First, a (u,r,w) difference set $D_1$ is constructed. Each of the difference sets other than $D_1$ is derived by multiplying modulo u the elements of $D_1$ by a residue modulo u that is relatively prime to u. The Mu rows of the connection matrix comprise M sets, $s_0, s_1, \ldots s_{M-1}$, each having u rows. Each of the channel designations of the input channels occurs exactly once in set $s_0$. For any integer i, $1 \leq i \leq M-1$, for any integer j, $0 \leq j \leq r-1$, and for the M−1 (u,r,w) difference sets $D_i = \{a_0^i, \ldots, a_{r-1}^i\}$, column j of set s is obtained by rotating column j of set $s_0$ by $a_j^i$ positions. (The superscript i does not denote exponentiation but rather identifies the elements such as $a_0^i$ as belonging to the difference set $D_i$.) The channel designations occurring in a given row of the connection matrix define the ones of the input channels connected to the inlets of a given first stage switch associated with the given row. The construction parameters for network 2500 are summarized in Table 3.

TABLE 3

CONSTRUCTION PARAMETERS
FOR NETWORK 2500

A Mu × r connection matrix derived form M-1
(u,r,w) difference sets is used to construct
connection arrangement 2540.
$N_1 > 1, n_2 > 1, n_2 \leq N_1, v \geq n_2, r > 1,$
$w > 0, M > 1, u > 1, ur \geq N_1, Mu \geq v$ Note that Mu is at least equal to v, the number of first stage switches, and ur is at least equal to $N_1$, the number of input channels. Networks can be derived from network 2500 for serving fewer input channels by deleting cells from the connection matrix and, if possible, eliminating first stage switches. Each of the input channels IC0 through IC($N_1-1$) is connected to exactly M first stage switch inlets. Considering the first stage switches in M groups, for any two first stage switches in a given group there are at most w first stage switches in each other group that intersect both of the two first stage switches in the given group (the w-double-intersect property). For any group of $n_2$ of the input channels IC0 through IC($N_1-1$), there is a group of $n_2$ of the first stage switches, e.g., 2501, 2502, each having one inlet connected to a different one of that group of input channels. It has been determined by mathematical analysis that network 2500 is a rearrangeable, broadcast network where $n_2$ is at most equal to $$\lfloor (M^3 - M^2)/w \rfloor + M + 1 \qquad (5)$$

where $\lfloor z \rfloor$ denotes the largest integer not exceeding z. Of course network 2500 can be extended to serve a greater number, $n_2$, of output channels by having multiple links between each first stage switch and the second stage switch as in network 2400 (FIG. 20). If there are x links between each first stage switch and the second stage switch, the network is a rearrangeable broadcast network where $n_2$ is at most equal to $$\lfloor (x^3 M^3 - x^2 M^2)/w \rfloor + xM + 1. \qquad (6)$$

Network 2500 can also be extended by having multiple second stage switches as in network 2300 (FIG. 19).

Figure 26:
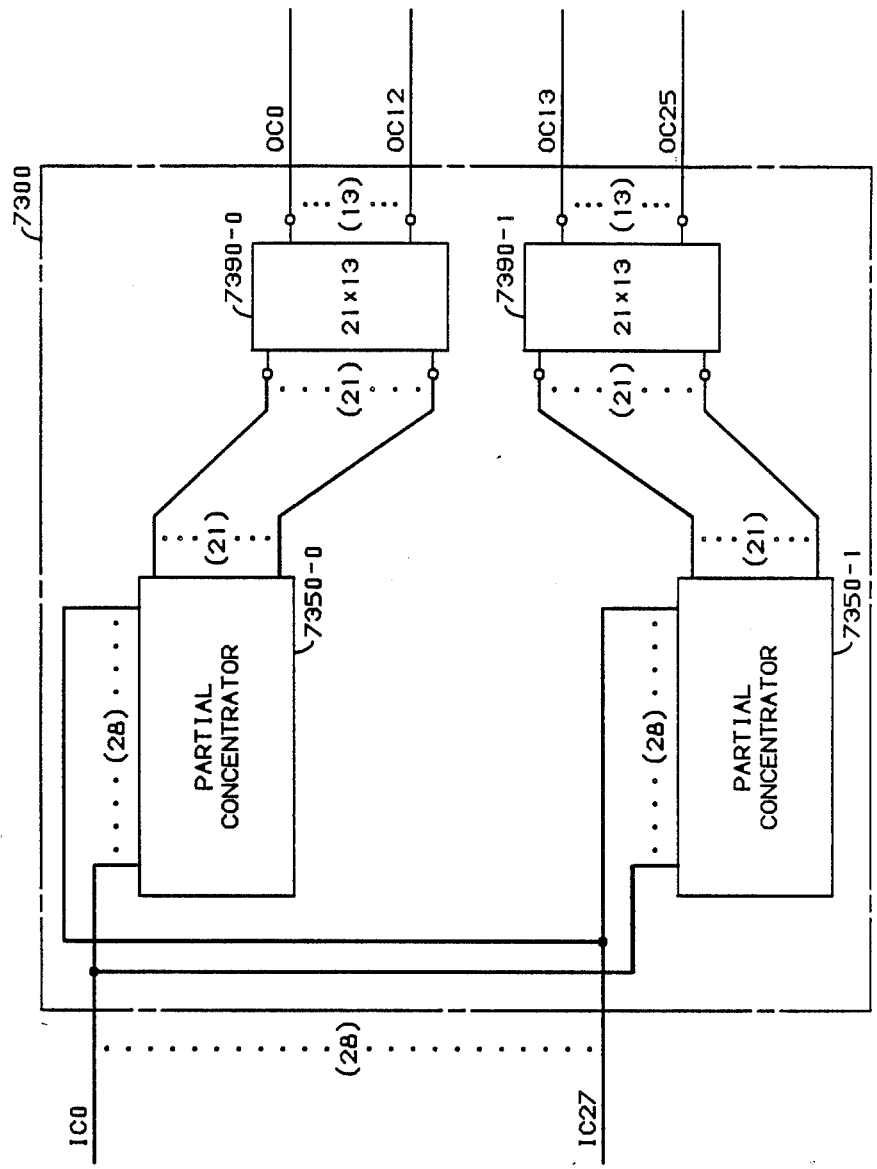

FIG. 26 is a block diagram of a two-stage, rearrangeable broadcast network 7300 that is equivalent to network 2300 (FIG. 19). The 21×13 rectangular switches 7390-0 and 7390-1 are identical to the second stage switches 2390-0 and 2390-1 of network 2300. However the connection arrangement 2340 and first stage switches 2310-0 through 2310-20 of network 2300 are replaced with two identical partial concentrators 7350-0 and 7350-1 in network 7300. Each of the partial concentrators 7350-0 and 7350-1 is identical to partial concentrator 2250 of network 2200 (FIG. 18). Of course the two partial concentrators 7350-0 and 7350-1 can also be represented as a single larger partial concentrator. Further the rows of the single larger partial concentrator can be reordered arbitrarily for practical design considerations, for example such that identical rows are consecutive.

Figure 27:
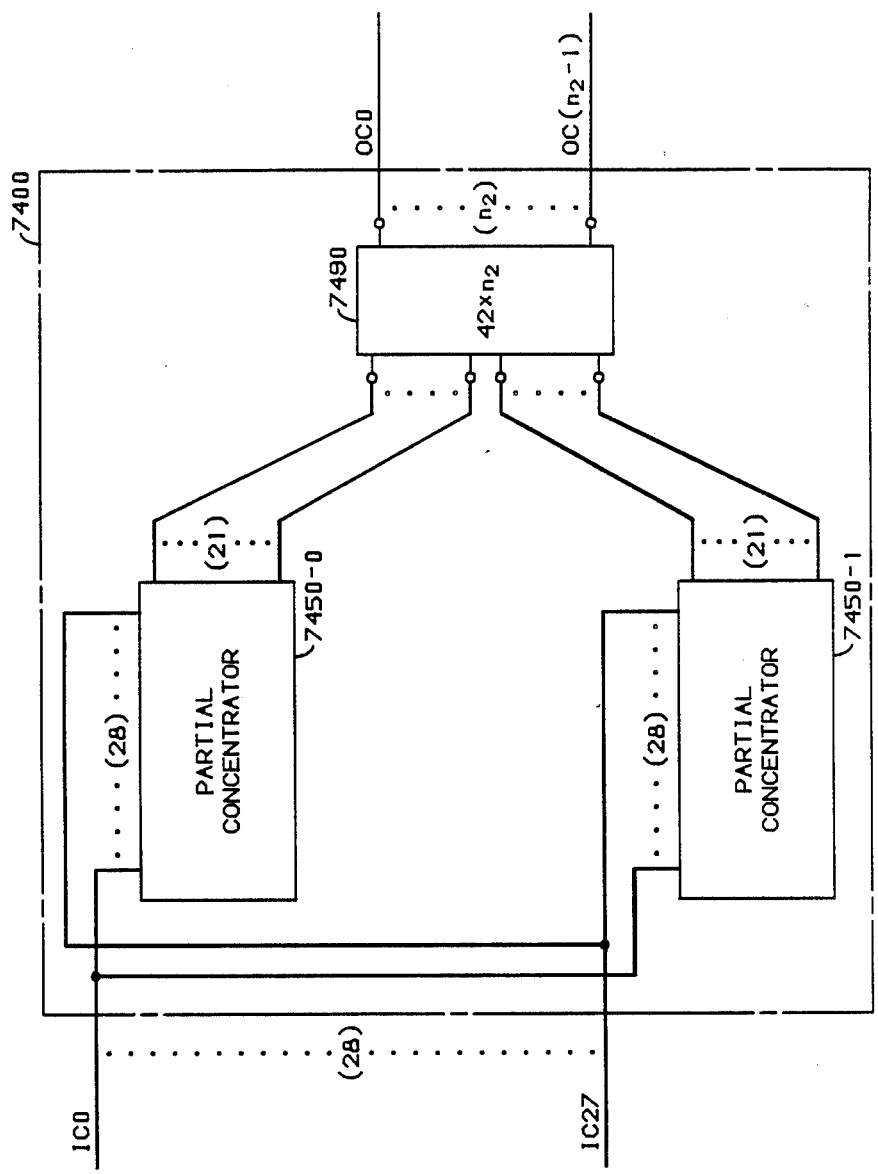

FIG. 27 is a block diagram of a two-stage, rearrangeable broadcast network 7400 that is equivalent to network 2400 (FIG. 20). The 42×$n_2$ rectangular switch 7490 is identical to second stage switch 2490 of network 2400. However the connection arrangement 2440 and first stage switches 2410-0 through 2410-20 of network 2400 are replaced with two (or, more generally, x) identical partial concentrators 7450-0 and 7450-1 in network 7400. Each of the partial concentrators 7450-0 and 7450-1 is identical to partial concentrator 2250 of network 2200 (FIG. 18).

What is claimed is:

1. A switching network for selectively connecting $N_1$ input channels to $n_2$ output channels such that none of said $n_2$ output channels is connected to more than one of said $N_1$ input channels at any time, $N_1$ and $n_2$ being positive integers each greater than one, $n_2$ being at most equal to $N_1$, said switching network comprising a partial concentrator having $N_1$ columns each connected to a different one of said $N_1$ input channels, and v rows, said partial concentrator comprising means for selectively connecting ones of said columns to ones of said rows, v being a positive integer at least equal to $n_2$, and a switch having $n_2$ outlets each connected to a different one of said output channels and v inlets each connected to a different one of said rows, said switch comprising means for selectively connecting said outlets to said inlets, said partial concentrator being derivable from a partial concentrator having ur columns and Mu rows and having each of said Mu rows incident to ones of said ur columns defined by a corresponding row of a Mu×r connection matrix, where a row is said to be incident to a column if there is a crosspoint at the intersection, where each of said ur columns has a unique column designation, where said matrix has Mu rows comprising M sets, $s_0, s_1, \ldots s_{M-1}$, each having u rows, where the column designation of each of said ur columns occurs exactly once in set $s_0$, where for any integer i, $1 \leq i \leq M-1$, for any integer j, $0 \leq j \leq r-1$, and for M−1 (u,r,w) difference sets $D_i = (a_0^i, \ldots a_{r-1}^i)$, column j of set $s_i$ is obtained by rotating column j of set $s_0$ by $a_j^i$ positions, where w is a positive integer, where M, r and u are positive integers each greater than one, where ur is at least equal to $N_1$, and where Mu is at least equal to v.

2. A switching network in accordance with claim 1 where M is a positive integer greater than two and where each of said difference sets other than $D_1$ is derivable by multiplying modulo u the elements of $D_1$ by a residue module u that is relatively prime to u.

3. A switching network in accordance with claim 1 wherein $n_2$ is at most equal to $|(M^3-M^2)/w|+M+1$.

4. A switching network for selectively connecting $N_1$ input channels to $n_2$ output channels such that none of said $n_2$ output channels connected to more than one of said $N_1$ input channels at any time, $N_1$ and $n_2$ being positive integers each greater than one, $n_2$ being at most equal to $N_1$, said switching network comprising a plurality of x partial concentrators each having $N_1$ columns each connected to a different one of said $N_1$ input channels, and v rows, said each partial concentrator comprising means for selectively connecting ones of said columns to ones of said rows, x being a positive integer greater than one and v being a positive integer at least equal to $n_2$, and a switch having $n_2$ outlets each connected to a different one of said output channels and xv inlets each connected to a different one of said rows of said x partial concentrators, said switch comprising means for selectively connecting said outlets to said inlets, said each partial concentrator being derivable from a partial concentrator having ur columns and Mu rows and having each of said Mu rows incident to ones of said ur columns defined by a corresponding row of a Mu×r connection matrix, where a row is said to be incident to a column if there is a crosspoint at the intersection, where each of said ur columns has a unique column designation, where said matrix has Mu rows comprising M sets, $s_0, s_1, \ldots s_{M-1}$, each having u rows, where the column designation of each of said ur columns occurs exactly once in set $s_0$, where for any integer i, $1 \leq i \leq M-1$, for any integer j, $0 \leq j \leq r-1$, and for $M-1$ (u,r,w) difference sets $D_i = \{a_0{}^i, \ldots a_{r-1}{}^i\}$, column j of set $s_i$ is obtained by rotating column j of set $s_0$ by $a_j{}^i$ positions, where w is a positive integer, where M, r and u are positive integers each greater than one, where ur is at least equal to $N_1$, and where Mu is at least equal to v.

5. A switching network in accordance with claim 4 wherein $n_2$ is at most equal to $|(x^3M^3-x^2M^2)/w|+xM+1$.

6. A switching network for selectively connecting $N_1$ input channels to $N_2$ output channels such that none of said $N_2$ output channels is connected to more than one of said $N_1$ input channels at any time, $N_1$ and $N_2$ being positive integers each greater than one, said switching network comprising a plurality of partial concentrators each having $N_1$ columns each connected to a different one of said $n_1$ input channels, and v rows, said each partial concentrator comprising means for selectively connecting ones of said columns to ones of said rows, v being a positive integer at least equal to a positive integer, $n_2$, that is less than $N_2$ and at most equal to $N_1$, and a plurality of switches each associated with a different one of said partial concentrators and each having $n_2$ outlets each connected to a different one of said output channels and v inlets each connected to a different one of the v rows of the associated partial concentrator, said each switch comprising means for selectively connecting said outlets of said each switch to said inlets of said each switch, said each partial concentrator being derivable from a partial concentrator having ur columns and Mu rows and having each of said Mu rows incident to ones of said ur columns defined by a corresponding row of a Mu×r connection matrix, where a row is said to be incident to a column if there is a crosspoint at the intersection, where each of said ur columns has a unique column designation, where said matrix has Mu rows comprising M sets, $s_0, s_1, \ldots s_{M-1}$, each having u rows, where the column designation of each of said ur columns occurs exactly once in set $s_0$, where for any integer i, $1 \leq i \leq M-1$, for any integer j, $0 \leq j \leq r-1$, and for $M-1$ (u,r,w) difference sets $D_i = \{a_0{}^i, \ldots a_{r-1}{}^i\}$, column j of set $s_i$ is obtained by rotating column j of set $s_0$ by $a_j{}^i$ positions, where w is a positive integer, where M, r and u are positive integers each greater than one, where ur is at least equal to $N_1$, and where Mu is at least equal to v.

* * * * *

UNITED STATES PATENT AND TRADEMARK OFFICE
CERTIFICATE OF CORRECTION

PATENT NO. : 4,944,029

DATED : July 24, 1990

INVENTOR(S) : Frank K. Hwang, Gaylord W. Richards

It is certified that error appears in the above-identified patent and that said Letters Patent is hereby corrected as shown below:

Column 3, line 4, "$D_i = \{a_o^i, \ldots a_{r-1}i\},$" should be "$D_i = \{a_o^i, \ldots a_{r-1}^i\},$";

Column 7, line 26, "$|(M^2-1)/w|+1$" should be "$\lceil (M^2-1)/w \rceil +1$";

Column 7, line 28, "$|y|$" should be "$\lceil y \rceil$";

Column 7, line 37, "$x[|(xM+1)(M-1)/w|+1].$" should be "$x[\lceil (xM+1)(M-1)/w \rceil +1].$"

Column 11, line 29, "$(M-1)(|M/w|+1)+|M/w|$" should be "$(M-1)(\lfloor M/w \rfloor +1)+ \lceil M/w \rceil$";

Column 11, line 31, "$|y|$" should be "$\lceil y \rceil$";

Column 11, line 32, "$|z|$" should be "$\lfloor z \rfloor$";

UNITED STATES PATENT AND TRADEMARK OFFICE
CERTIFICATE OF CORRECTION

PATENT NO. : 4,944,029

DATED : July 24, 1990

INVENTOR(S) : Frank K. Hwang, Gaylord W. Richards

It is certified that error appears in the above-identified patent and that said Letters Patent is hereby corrected as shown below:

Column 11, lines 42-44, "$x|A/B+1|$, where $A=w(M-1)(|xM/w|+1)^2$ and $B=w(|xM/w|+1)-x$." should be "$x\lfloor A/B+1 \rfloor$, where $A=w(M-1)(\lfloor xM/w \rfloor +1)^2$ and $B=w(\lfloor xM/w \rfloor +1)-x$.";

Column 15, line 19, "$D_i=\{a_o^i, \ldots a_{r-1}i\}$," should be "$D_i=\{a_o^i, \ldots a_{r-1}^i\}$,";

Column 15, line 58, "$|(M^3-M^2)/w|+M+1$" should be "$\lfloor (M^3-M^2)/w \rfloor +M+1$";

Column 15, line 60, "$|z|$" should be "$\lfloor z \rfloor$";

Column 16, line 1, "$|(x^3M^3-x^2M^2)/W|+xM+1$." should be "$\lfloor (x^3M^3-x^2M^2)/w \rfloor +xM+1$.";

Column 16, line 66, "$D_i=(a_o^i, \ldots a_{r-1}i)$," should be "$D_i=\{a_o^i, \ldots a_{r-1}^i\}$,";

Column 17, line 7, "module u" should be "modulo u";

UNITED STATES PATENT AND TRADEMARK OFFICE
CERTIFICATE OF CORRECTION

PATENT NO. : 4,944,029

DATED : July 24, 1990

INVENTOR(S) : Frank K. Hwang, Gaylord W. Richards

It is certified that error appears in the above-identified patent and that said Letters Patent is hereby corrected as shown below:

Column 17, line 9, "$|(M^3-M^2)/w|+M+1$" should be "$\lfloor(M^3-M^2)/w\rfloor+M+1$";

Column 17, line 12, "channels connected" should be "channels is connected";

Column 17, line 45, "$D_i=\{a_o^i, \ldots a_{r-1}i\},$" should be "$D_i=\{a_o^i, \ldots a_{r-1}^i\},$";

Column 18, line 5, "$|(x^3M^3-x^2M^2)/w|+xM+1$" should be "$\lfloor(x^3M^3-x^2M^2)/w\rfloor+xM+1$";

Column 18, line 14, "$n_1$ input" should be "$N_1$ input";

Column 18, line 42, "$D_i=\{a_o^i, \ldots a_{r-1}i\}$" should be "$D_i=\{a_o^i, \ldots a_{r-1}^i\}$";

UNITED STATES PATENT AND TRADEMARK OFFICE
CERTIFICATE OF CORRECTION

PATENT NO. : 4,944,029

DATED : July 24, 1990

INVENTOR(S) : Frank K. Hwang, Gaylord W. Richards

It is certified that error appears in the above-identified patent and that said Letters Patent is hereby corrected as shown below:

Column 18, line 42, "of set si is" should be "of set $s_i$ is".

Signed and Sealed this

First Day of September, 1992

Attest:

DOUGLAS B. COMER

Attesting Officer

Acting Commissioner of Patents and Trademarks